United States Patent [19]
Collier, Jr. et al.

[11] Patent Number: 5,660,602
[45] Date of Patent: Aug. 26, 1997

[54] HYDROGEN ENRICHED NATURAL GAS AS A CLEAN MOTOR FUEL

[75] Inventors: Robert Kirk Collier, Jr., Merritt Island; Robert Louis Hoekstra, Oviedo; David Neal Mulligan, Titusville; Douglas Edward Hahn, Melbourne, all of Fla.

[73] Assignee: University of Central Florida, Orlando, Fla.

[21] Appl. No.: 611,400

[22] Filed: Mar. 4, 1996

Related U.S. Application Data

[63] Continuation of Ser. No. 237,900, May 4, 1994, abandoned.

[51] Int. Cl.$^6$ ........................................ C01B 3/00
[52] U.S. Cl. ................... 48/127.3; 48/197 FM; 123/1 A; 123/3; 123/276
[58] Field of Search .................... 48/127.3, 197 FM, 48/199 FM; 123/1 A, 3, 276 E, DIG. 12

[56] References Cited

U.S. PATENT DOCUMENTS

| | | | |
|---|---|---|---|
| 1,275,252 | 8/1918 | Harris | 48/199 FM |
| 1,404,223 | 1/1922 | Rose et al. | 48/199 FM |
| 1,505,338 | 8/1924 | Harris | 48/199 FM |
| 1,628,066 | 5/1927 | Rose | 48/199 FM |
| 1,863,636 | 6/1932 | Quelch | 48/197 FM |
| 1,936,155 | 11/1933 | Florez | 48/199 FM |
| 1,936,156 | 11/1933 | Florez | 48/199 FM |
| 2,956,093 | 10/1960 | Nicolai | 48/199 FM |
| 3,759,679 | 9/1973 | Franz et al. | 48/199 FM |
| 3,976,034 | 8/1976 | Shinohara et al. | 123/3 |
| 3,982,910 | 9/1976 | Houseman et al. | 123/3 |
| 4,086,877 | 5/1978 | Henkel et al. | 123/3 |
| 4,112,876 | 9/1978 | Mentschel | 123/3 |
| 4,131,086 | 12/1978 | Noguchi et al. | 123/3 |
| 4,143,620 | 3/1979 | Noguchi et al. | 123/3 |
| 4,223,642 | 9/1980 | Okubo | 123/3 |
| 4,376,097 | 3/1983 | Emelock | 422/189 |
| 4,508,064 | 4/1985 | Watanabe | 123/1 A |
| 4,520,763 | 6/1985 | Lynch et al. | 123/1 A |
| 4,569,890 | 2/1986 | Barthel | 48/197 FM |
| 4,722,303 | 2/1988 | Leonard | 123/3 |
| 5,139,002 | 8/1992 | Lynch et al. | 123/575 |
| 5,156,114 | 10/1992 | Gunnerman | 123/1 A |
| 5,176,809 | 1/1993 | Simuni | 204/273 |
| 5,207,185 | 5/1993 | Greiner et al. | 123/3 |
| 5,248,566 | 9/1993 | Kumar et al. | 429/19 |
| 5,293,857 | 3/1994 | Meyer | 123/3 |
| 5,297,515 | 3/1994 | Gale et al. | 123/3 |

OTHER PUBLICATIONS

"Clean Automotive Fuel, engine Emissions Using Natural Gas, Hydrogen–Enriched Natural Gas, Manufactured From Coal (Synthane)" D.B. Eccleston and R. D. Fleming, Bartlesville Energy R Center, Bartlesville, OK, Bureau of Mines Automotive Exhaust Emissions Program, Technical I Report—48, Feb. 1972, US Dept of the Interior.

"Fuel Economy and Emissions of Lean Burn Engines", Harrow et al., I Mech. E. HQ Conference publications, pp. 39–50, Jun. 1979.

*Primary Examiner*—Timothy McMahon
*Attorney, Agent, or Firm*—Brian S. Steinberger; Law Offices of Brian S. Steinberger

[57] ABSTRACT

A fuel mixture is disclosed. In a preferred embodiment, an alternative gaseous fuel for operating a combustion engine includes approximately 21 to 50% Hydrogen and the rest natural gas constituents such as combinations of Methane, Carbon Dioxide, Nitrogen, Ethane, Propane, Iso-Butane, N-Butane, Iso Pentane, N-Pentane, and Hexanes Plus. Current production engines without any substantial modifications can take this alternative fuel. This alternative fuel is lean burning and emits emissions that are below current legal standards.

10 Claims, 20 Drawing Sheets

EXHAUST EMISSIONS FOR NATURAL GAS AND HYDROGEN MIXTURES

0% Hydrogen
— Total Oxides of Nitrogen
--- Unburned Hydrocarbons

EXHAUST EMISSIONS FOR NATURAL GAS AND HYDROGEN MIXTURES

EXHAUST EMISSIONS FOR NATURAL GAS AND HYDROGEN MIXTURES

HYDROGEN ENRICHED NATURAL GAS AS A CLEAN MOTOR FUEL

This application is a Continuation of application Ser. No. 08/237,900 filed on May 4, 1994, now abandoned entitled: Hydrogen Enriched Natural Gas As A Clean Motor Fuel.

This invention relates to fuels, and in particular to a hydrogen and natural gas mixture used as a fuel for combustion engines. This invention was funded in part under contract no. DCA 92SE20061505026 from the Florida Energy Office.

BACKGROUND AND PRIOR ART

Due to the world's depleting reserves of fossil fuels such as oil, there exists a need for alternative fuel vehicles (AFV's). The Energy Policy Act (EPACT) signed by President Bush in 1992 requires that states and the federal government take steps to reduce energy use and to shift to other sources of energy, including the addition of alternative fuel vehicles(AFV's) to federal and state fleets. Individual states such as California and New York have instituted goals of near-zero emission standards for percentages of new vehicles sold within those states in the near future. Thus, the need exists for alternative fuels.

Natural gas has long been considered an excellent alternative fuel since it is considered much cleaner than other fossil fuels such as oil, and its reserves are much larger than crude oil. Natural gas is primarily composed of methane and combinations of Carbon Dioxide, Nitrogen, Ethane, Propane, Iso-Butane, N-Butane, Iso Pentane, N-Pentane, and Hexanes Plus. Natural gas is a renewable energy source since anaerobic bacterial eventually will convert all plants into methane type gas. Natural gas has an extremely high octane number, approximately 130, thus allowing higher compression ratios and broad flammability limits.

A problem with using natural gas is reduced power output when compared to gasoline, due mostly to the loss in volumetric efficiency with gaseous fuels, as well as the lack of the infrastructure for fueling natural gas vehicles. Another problem area is the emissions produced by these natural gas vehicles. Although, the emissions are potentially less than that of gasoline vehicles, these vehicles generally require some types of emissions controls such as exhaust gas recirculation(EGR), positive crankcase ventilation(PCV), and/or unique three-way catalyst. A still another problem with using natural gas vehicles is the slow flame speed which requires that the fuel be ignited substantially before top dead center (BTDC). In general, most internal combustion engines running on gasoline operate with a spark advance of approximately 35 degrees BTDC where as the same engine operating on natural gas will require an approximate advance of 50 degrees BTDC. The slower burn rate of the fuel results in reduced thermal efficiency and poor burn characteristics.

Proposed alternative fuels utilizing hydrogen and fossil fuels have also been used with resulting problems. In an article entitled Houseman et at., "A Two-Charge Engine Concept: Hydrogen Enrichment" SAE Paper #741169 (1974), research was conducted at the Jet Propulsion Laboratory. The researchers ran a V-8 internal combustion engine on a mixture of gasoline and hydrogen. The addition of hydrogen allowed the engine to be operated much leaner than was possible on gasoline alone. The result of this research was that $NO_x$ emissions were reduced below the 1977 EPA standard of 0.4 gm per mile. The article states that "At an equivalence ratio of 0.53, very low $NO_x$ and CO were produced and engine thermal efficiency was substantially increased over stock gasoline configurations. The article mentions that in order to "operate a vehicle on fuel mixtures of gasoline and hydrogen, an onboard source of hydrogen is required. Onboard storage of hydrogen, either as a compressed gas, as a liquid at cryogenic temperature, or as a hydrode is not a practical solution today. Direct generation of hydrogen from gasoline in an onboard reactor was selected as the best solution to the problem." The main problem with this device was that the reactor described has not been adopted due to the complexity of the device.

The articles by MacDonald, J. S., entitled "Evaluation of the Hydrogen Supplemented Fuel Concept with an Experimental Multicylinder Engine" Automotive Engineering Congress and Exposition, SAE Paper #760101 (1976), and by Parks, F. B., entitled "A Single-Cylinder Engine Study of Hydrogen-Rich Fuels" Automotive Engineering Congress and Exposition, SAE Paper #760099 (1976) were by authors from General Motors that also investigated the use of hydrogen-enriched gasoline. Reflecting on Houseman et al.'s work, MacDonald states that, "while this approach (hydrogen reactor) as been shown to be feasible, it does have its limitations. A problem is the maximum theoretical yield of hydrogen per pound of fuel is about 14% by weight. Another problem is the hydrogen generator is at best only 80% efficient, so that any gasoline going to the generator represents an efficiency loss, which is a loss in fuel economy. For these reasons it is desirable to keep the quantity of hydrogen required for acceptable engine operation to a minimum. This article goes on to report that when 14.4% of the fuel mass was hydrogen the engine operated satisfactorily with an equivalence ratio of 0.52 and the $NO_x$ levels had dropped below the EPA mandated level of 0.4 gm per mile.

Several U.S. patents have incorporated similar concepts. For example, U.S. Pat. No. 4,376,097 to Emelock describes a hydrogen generator for motor vehicles. U.S. Pat. No. 4,508,064 to Watanabe describes a customized engine for burning hydrogen gas. U.S. Pat. No. 5,176,809 to Simuni describes a technique of producing and recycling hydrogen from exhaust gases.

Some research has been conducted for combining hydrogen and natural gas as a fuel mixture. Articles by Nagalingam et al. entitled: "Performance Study Using Natural Gas, Hydrogen-Supplemented Natural Gas and Hydrogen in AVL Research Engine", International Journal of Hydrogen Energy, Vol 8, No. 9, pp. 715–720, 1983; Fulton et al. entitled: "Hydrogen for Reducing Emissions from Alternative Fuel Vehicles" 1993 SAE Future Transportation Conference, SAE Paper from Alternative Fuel Vehicles" 1993 SAE Future Transportation Conference, SAE Paper #931813, (1993) and an article by Yusuf entitled: "In Cylinder Flame Front Growth Rate Measurement of Methane and Hydrogen Enriched Methane Fuel in a Spark Ignited Internal Combustion Engine, Unpublished Masters Thesis, University of Miami (1990) each disclosed such combinations of a fuel mixture. However, the mixtures were generally limited to 20% hydrogen and the rest generally methane.

U.S. Pat. No. 5,139,002 to Lynch et al., states that hydrogen enriched mixtures should only contain mixtures of up to levels of between "10 and 20%" hydrogen. See column 9, lines 49–60, and column 16, lines 14–21. At column 9, lines 37–60, Lynch et al. states that "Relatively few tests were necessary to rule out the 25% and 30% mixtures (of hydrogen) . . . ."

Despite its clean burning characteristics, the utilization of hydrogen has had many problems as an alternative fuel.

Primarily, the use of hydrogen in vehicles has been limited by the size, weight, complexity and cost of hydrogen storage options as well as the cost of hydrogen.

SUMMARY OF THE INVENTION

The first objective of the present invention is to provide a hydrogen and natural gas mixture that can extend the lean combustion limits of natural gas as a motor fuel.

The second object of this invention is to provide a hydrogen and natural gas mixture that substantially reduces the harmful exhaust emissions produced by conventional combustion engines.

The third object of this invention is to provide a hydrogen and natural gas mixture that can be used in existing gaseous vehicles without major modification and additions to those vehicles.

The fourth object of this invention is to provide a hydrogen and natural gas mixture that can meet long term federal and state emission requirements.

The fifth object of this invention is to provide a hydrogen and natural gas fuel mixture that optimizes the cost of the fuel against exhaust emissions.

The sixth object of this invention is to provide a hydrogen and natural gas fuel mixture that contains approximately 21 to 50% hydrogen and the rest natural gas such as methane.

Further objects and advantages of this invention will be apparent from the following detailed description of a presently preferred embodiment which is illustrated schematically in the accompanying drawings.

DESCRIPTION OF THE PREFERRED EMBODIMENT

Figure 1:
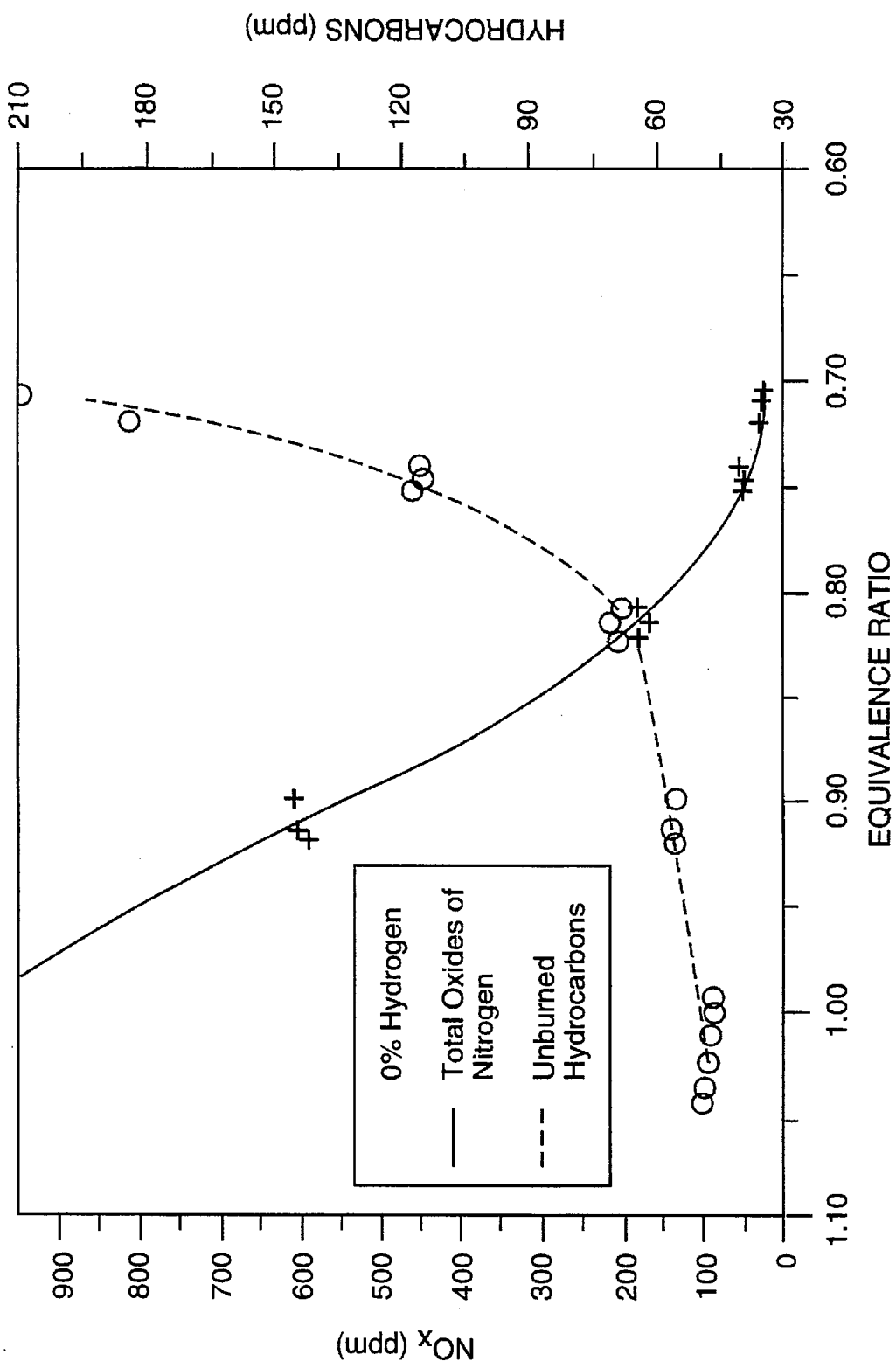
FIG. 1 shows a graph of exhaust emissions for natural gas and 0% hydrogen mixtures in parts per million(PPM) vs. Equivalence Ratio.
Figure 2:
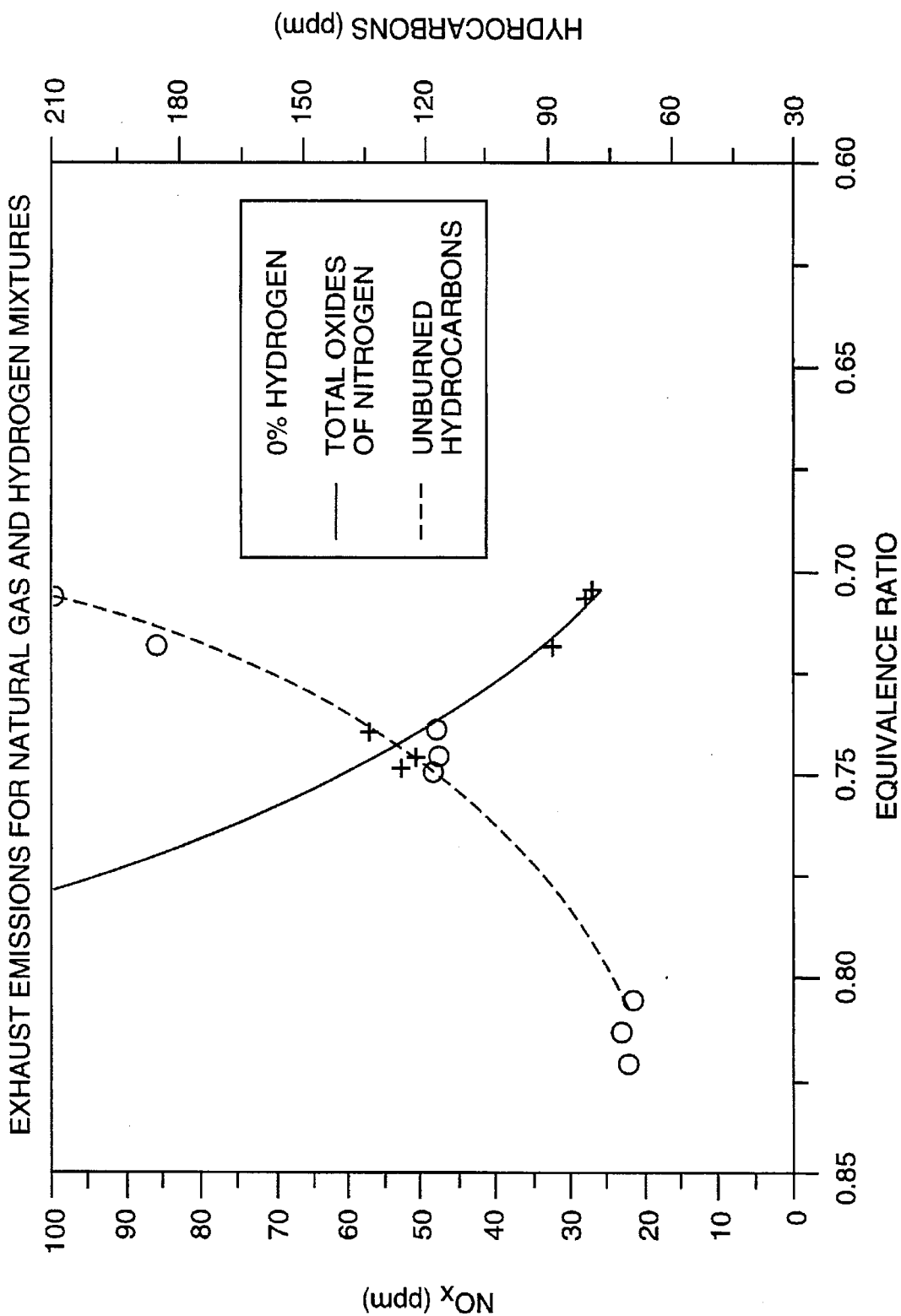
FIG. 2 shows an enlarged sectional graph of FIG. 1 of exhaust emissions for natural gas and 0% hydrogen mixtures in parts per million(PPM) vs. Equivalence Ratio.
Figure 3:
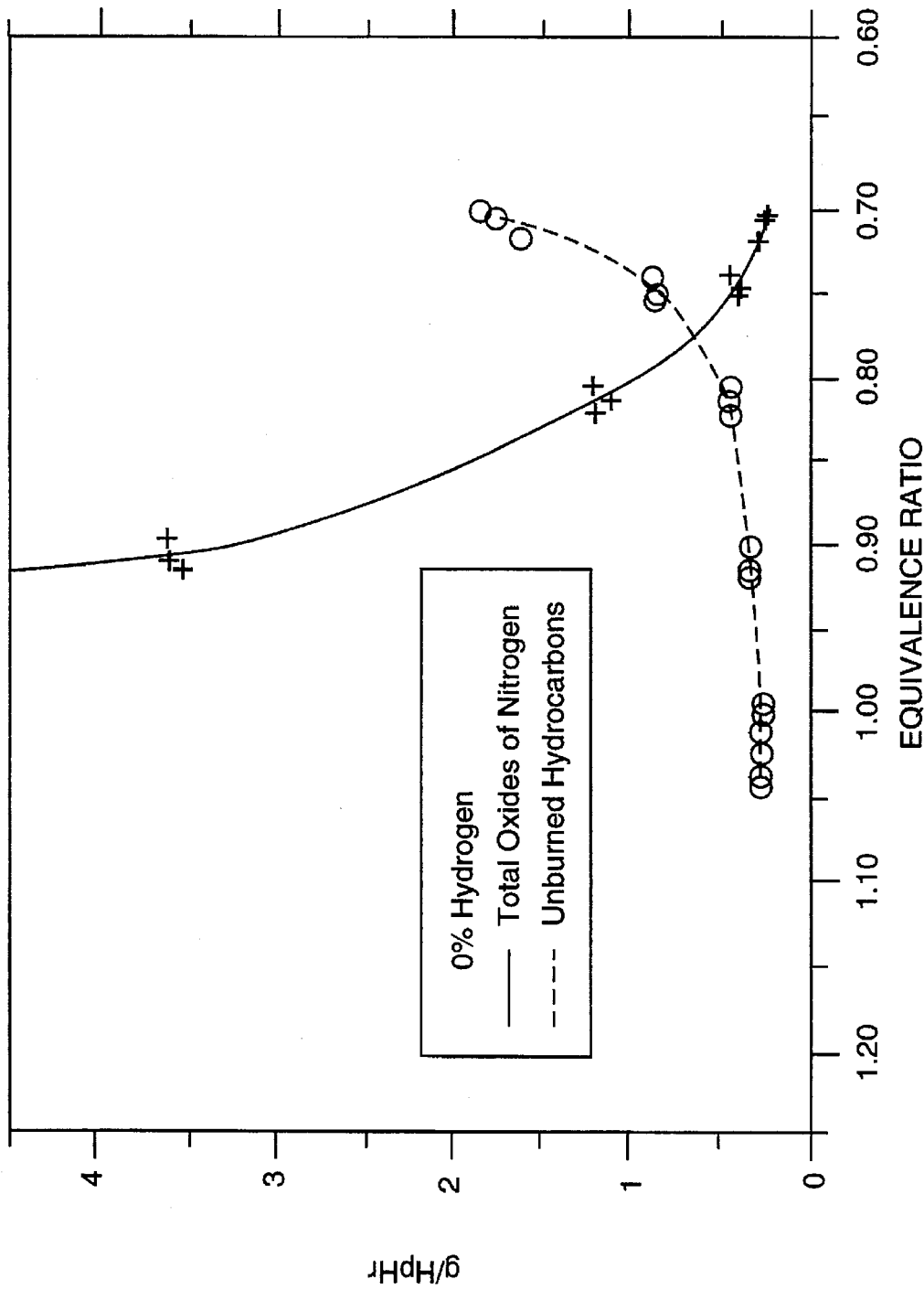
FIG. 3 shows a graph of exhaust emissions for natural gas and 0% hydrogen mixtures in grams per horse power hour(g/HpHr) vs. Equivalence ratio.
Figure 4:
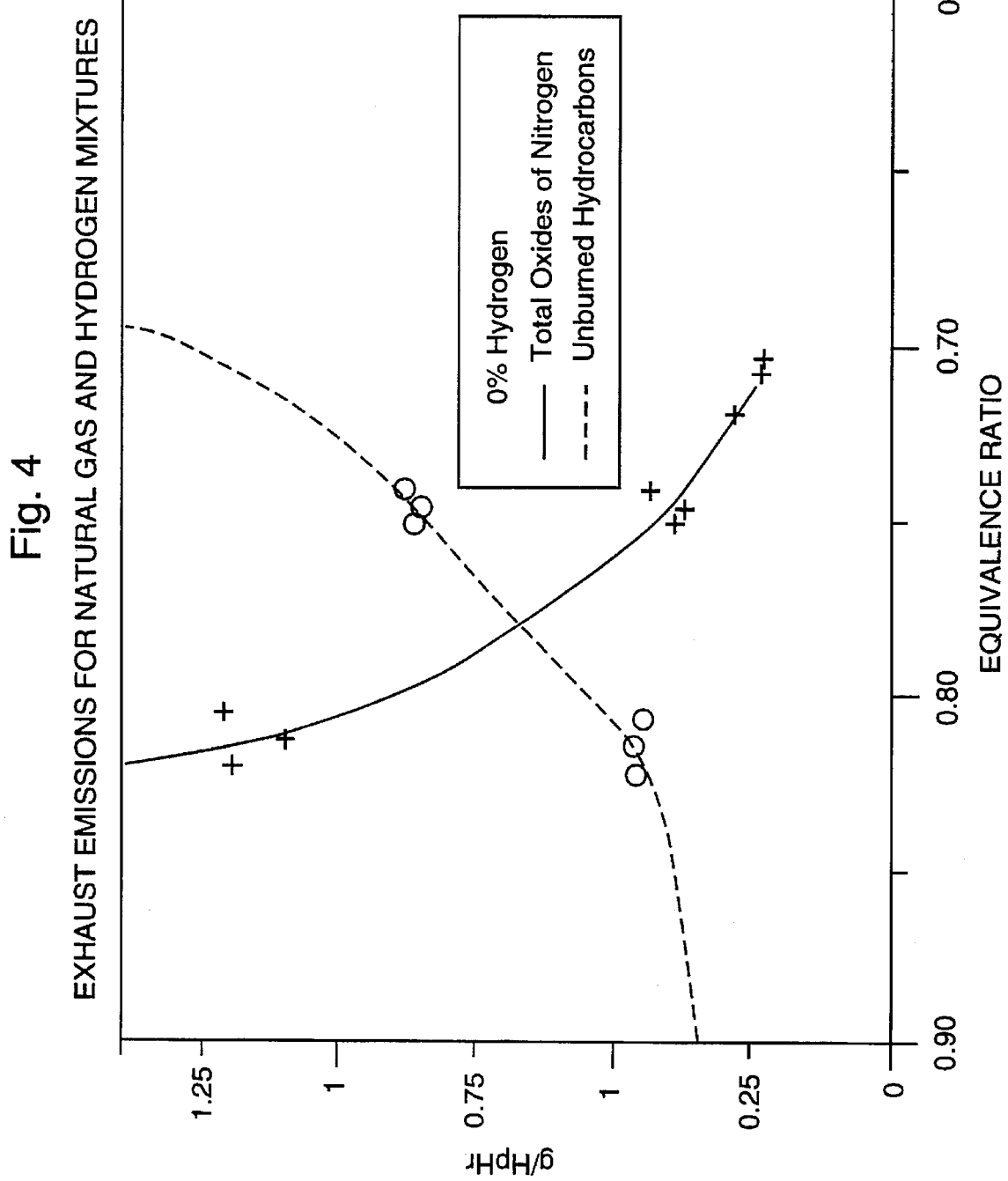
FIG. 4 shows an enlarged sectional graph of FIG. 3 of exhaust emissions for natural gas and 0% hydrogen mixtures in grams per horse power hour(g/HpHr) vs. Equivalence ratio.
Figure 5:
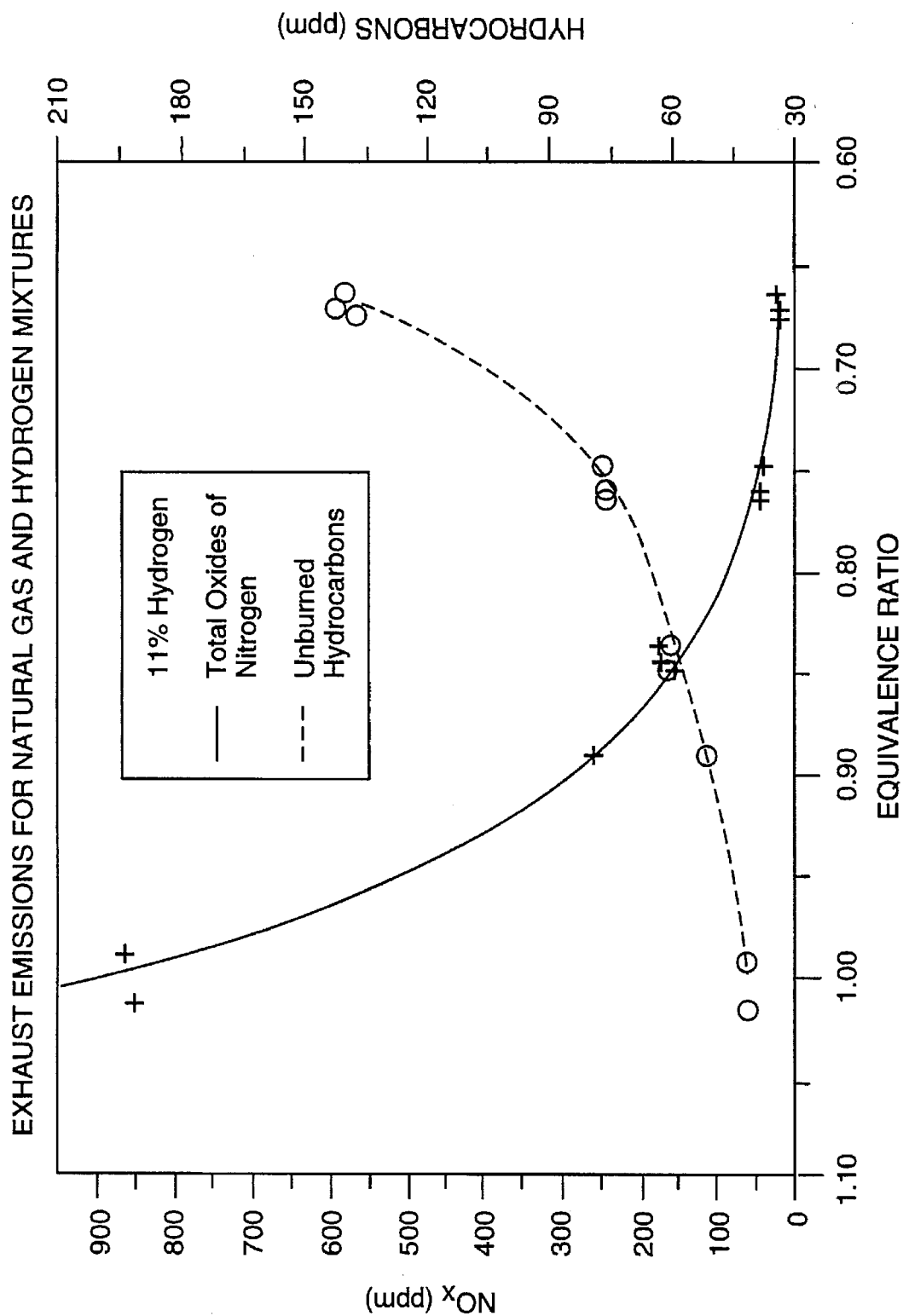
FIG. 5 shows a graph of exhaust emissions for natural gas and 11% hydrogen mixtures in parts per million(PPM) vs. Equivalence Ratio.
Figure 6:
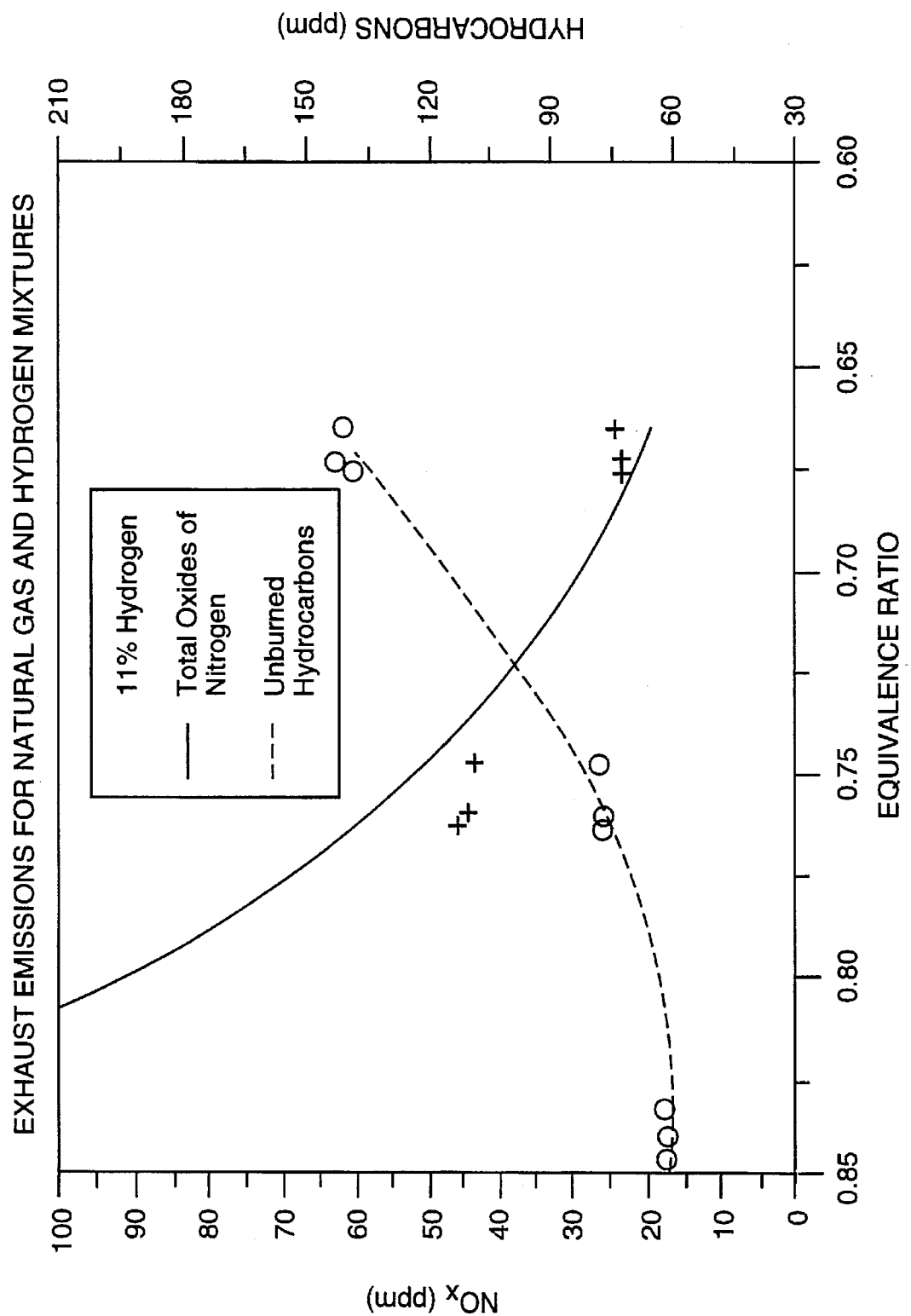
FIG. 6 shows an enlarged sectional graph of FIG. 5 of exhaust emissions for natural gas and 11% hydrogen mixtures in parts per million(PPM) vs. Equivalence Ratio.
Figure 7:
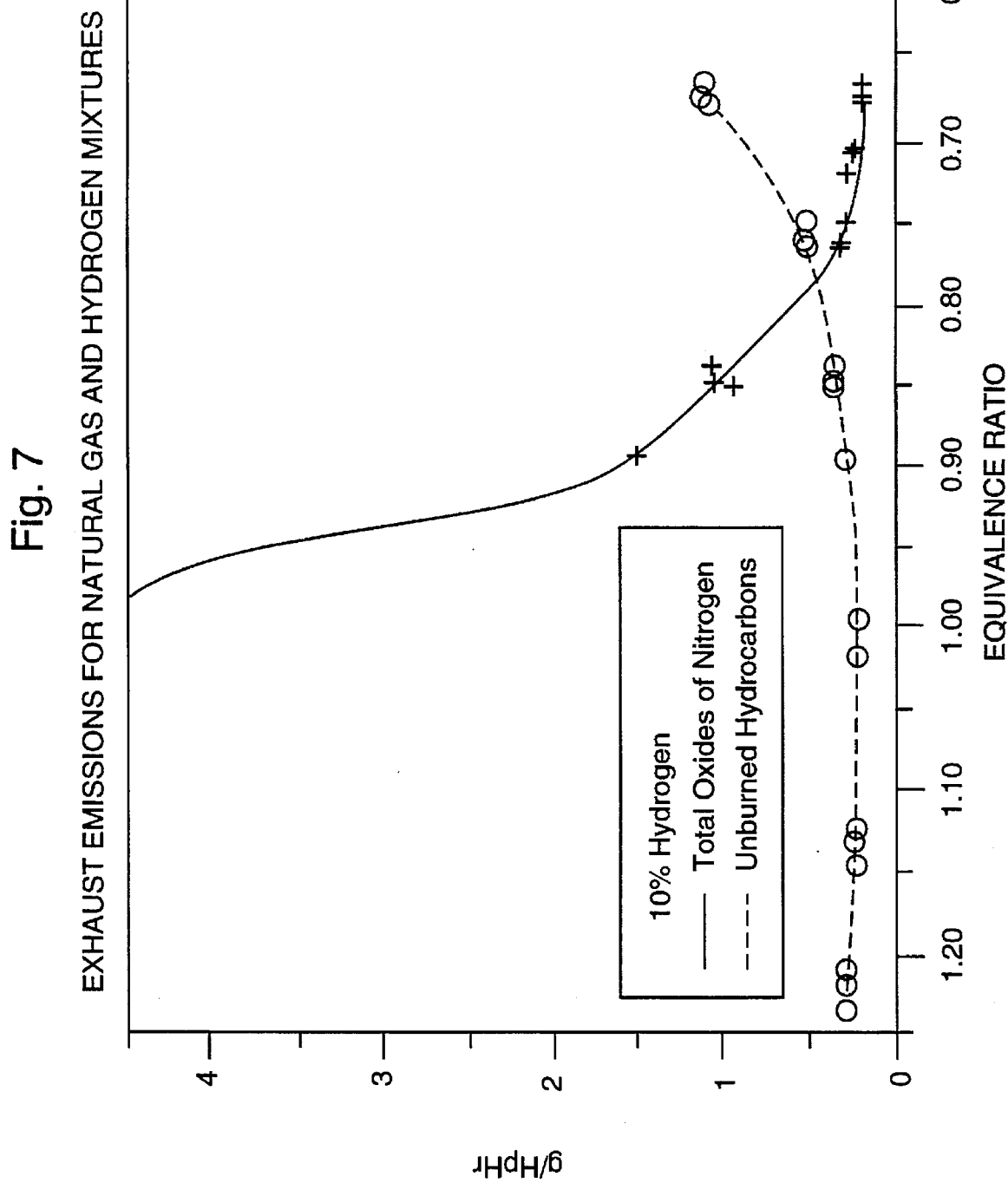
FIG. 7 shows a graph of exhaust emissions for natural gas and 10% hydrogen mixtures in grams per horse power hour(g/HpHr) vs. Equivalence ratio.
Figure 8:
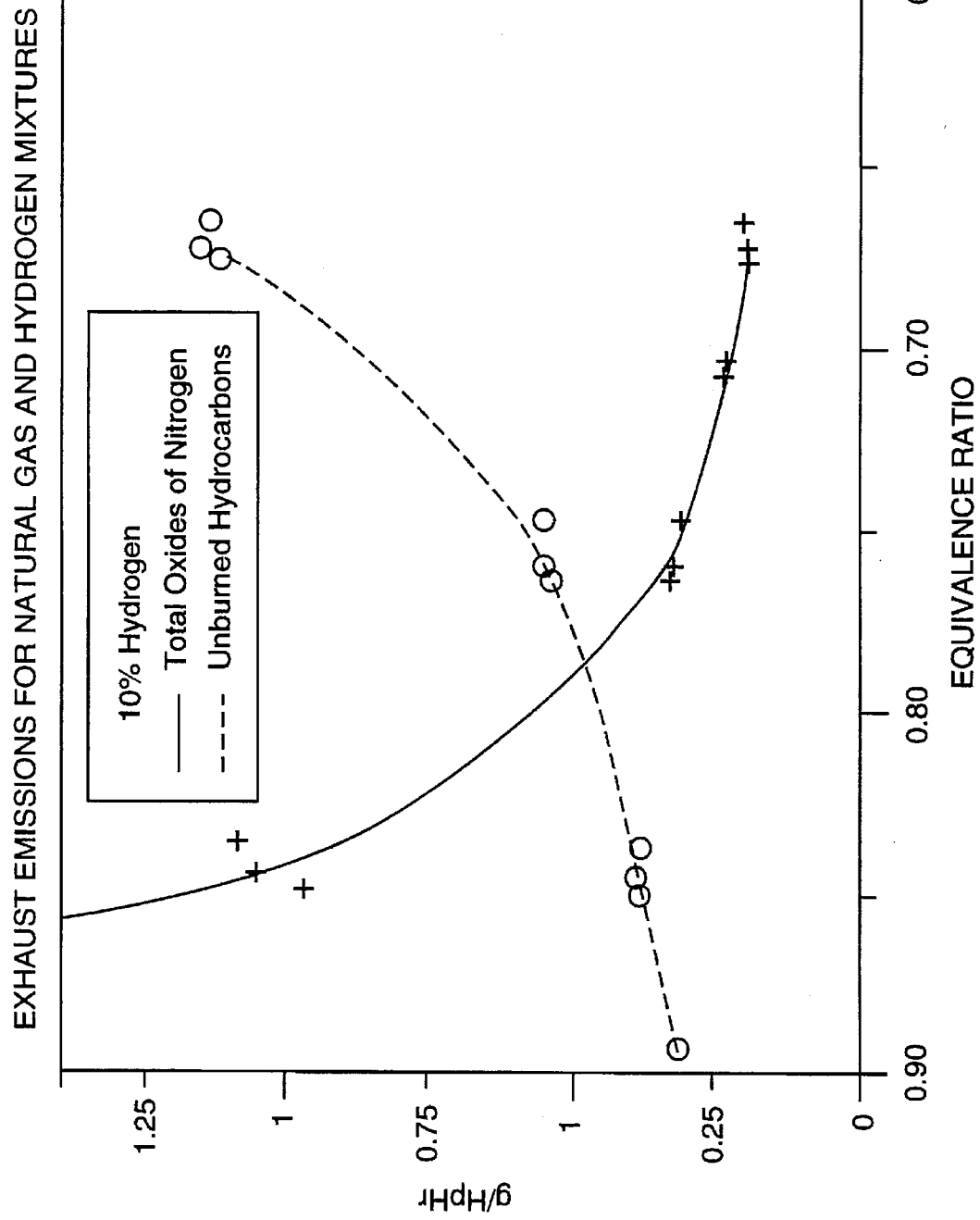
FIG. 8 shows an enlarged sectional graph of FIG. 7 of exhaust emissions for natural gas and 10% hydrogen mixtures in grams per horse power hour(g/HpHr) vs. Equivalence ratio.
Figure 9:
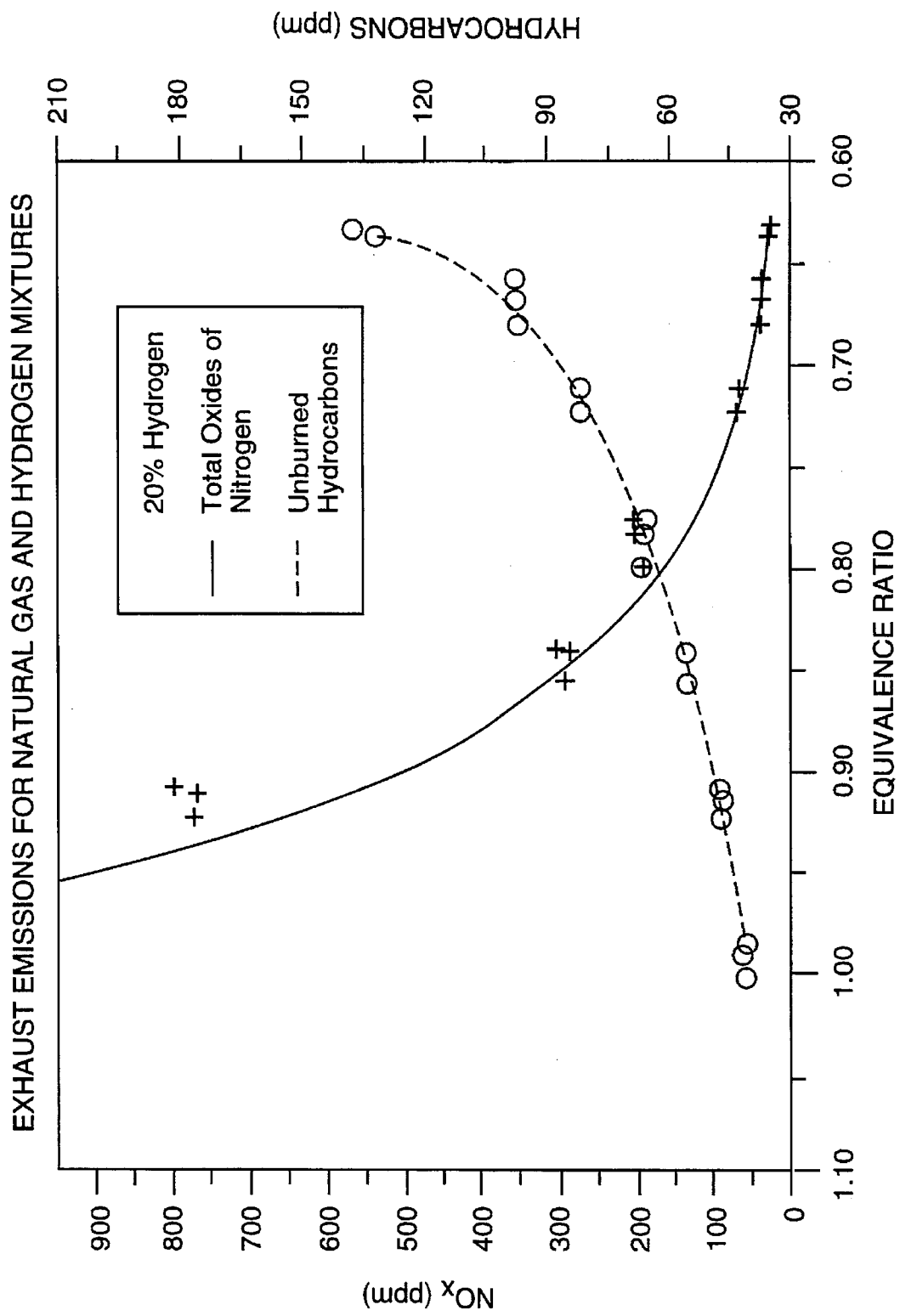
FIG. 9 shows a graph of exhaust emissions for natural gas and 20% hydrogen mixtures in parts per million(PPM) vs. Equivalence Ratio.
Figure 10:
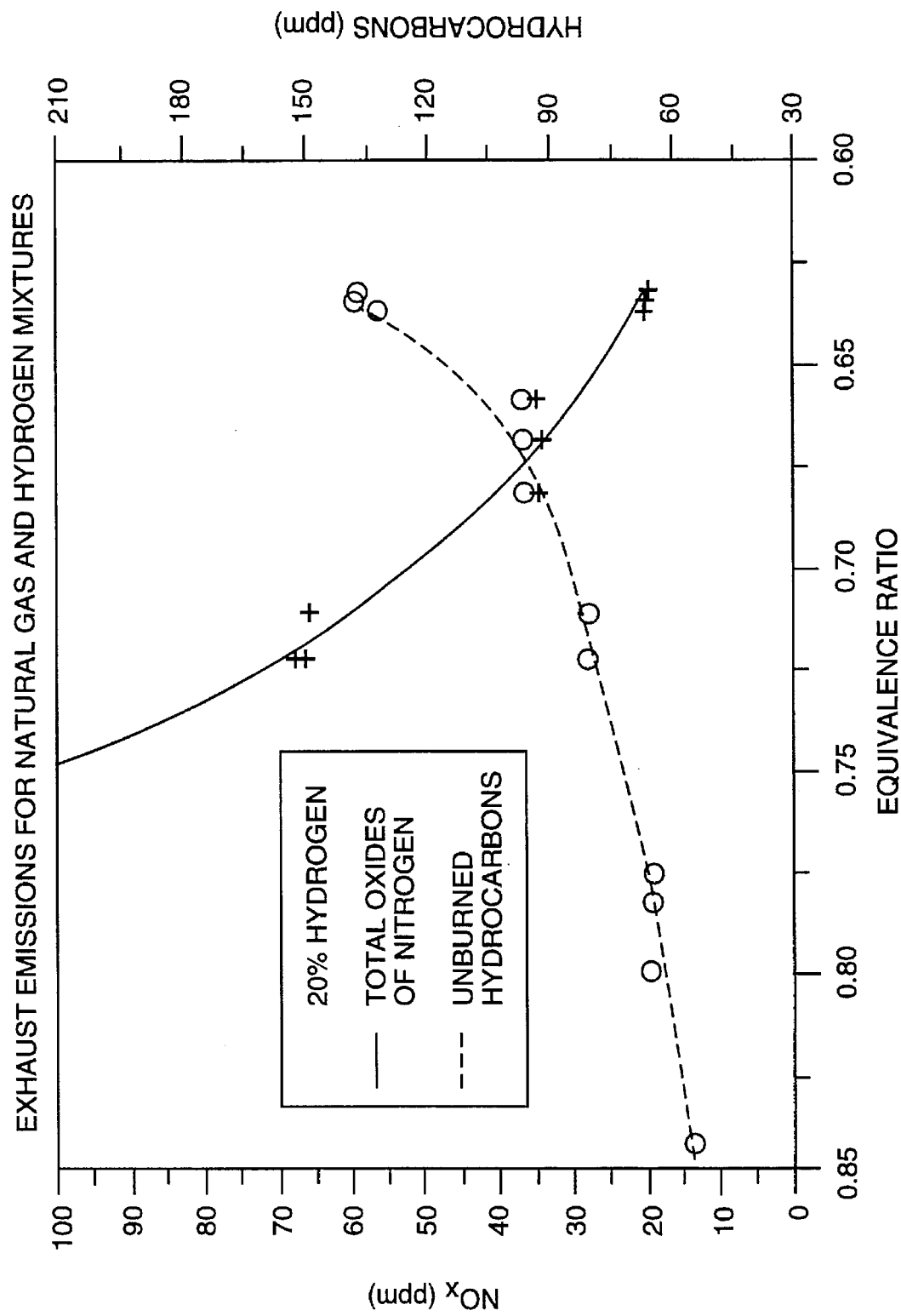
FIG. 10 shows an enlarged sectional graph of FIG. 9 of exhaust emissions for natural gas and 20% hydrogen mixtures in pans per million(PPM) vs. Equivalence Ratio.
Figure 11:
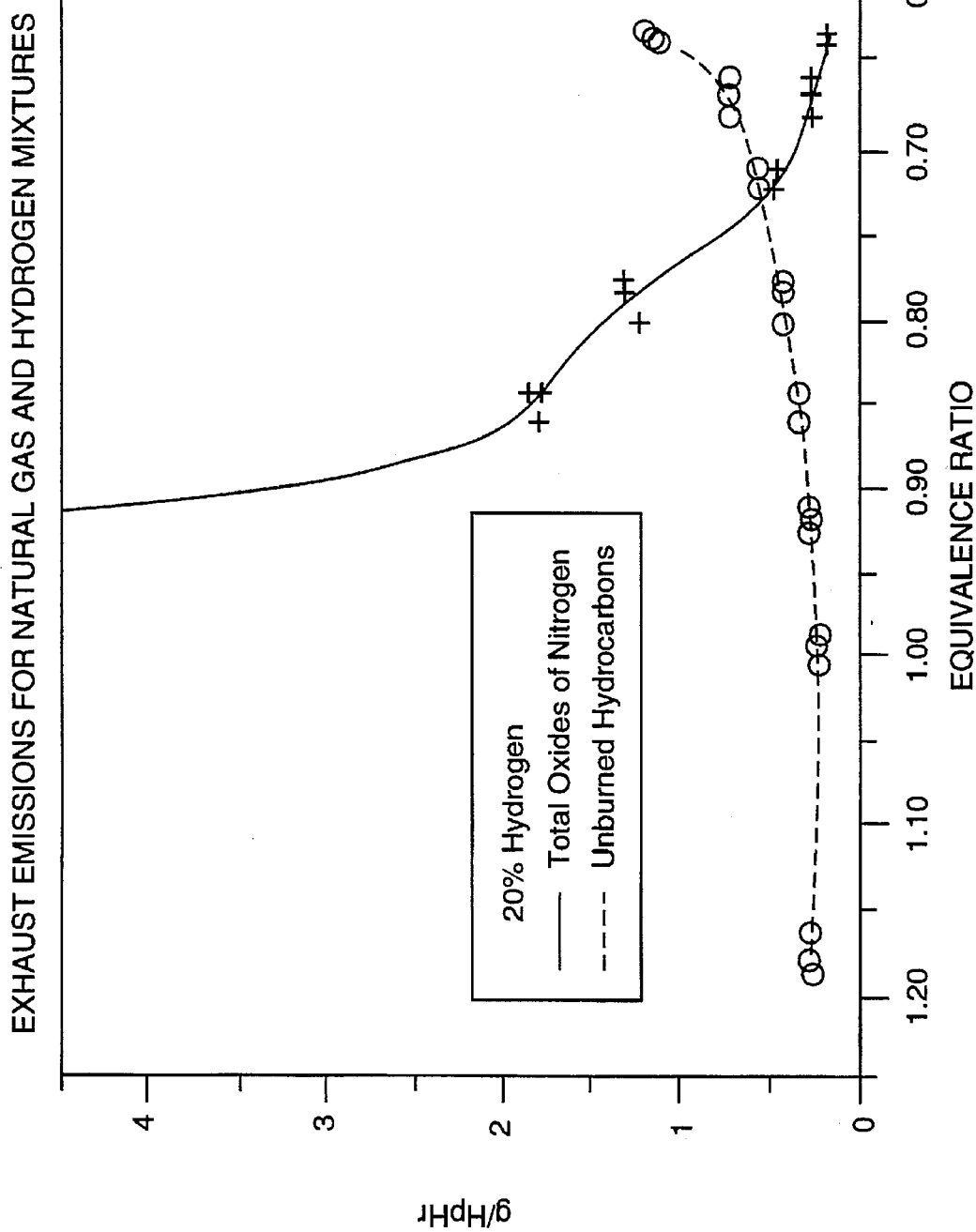
FIG. 11 shows a graph of exhaust emissions for natural gas and 20% hydrogen mixtures in grams per horse power hour(g/HpHr) vs. Equivalence ratio.
Figure 12:
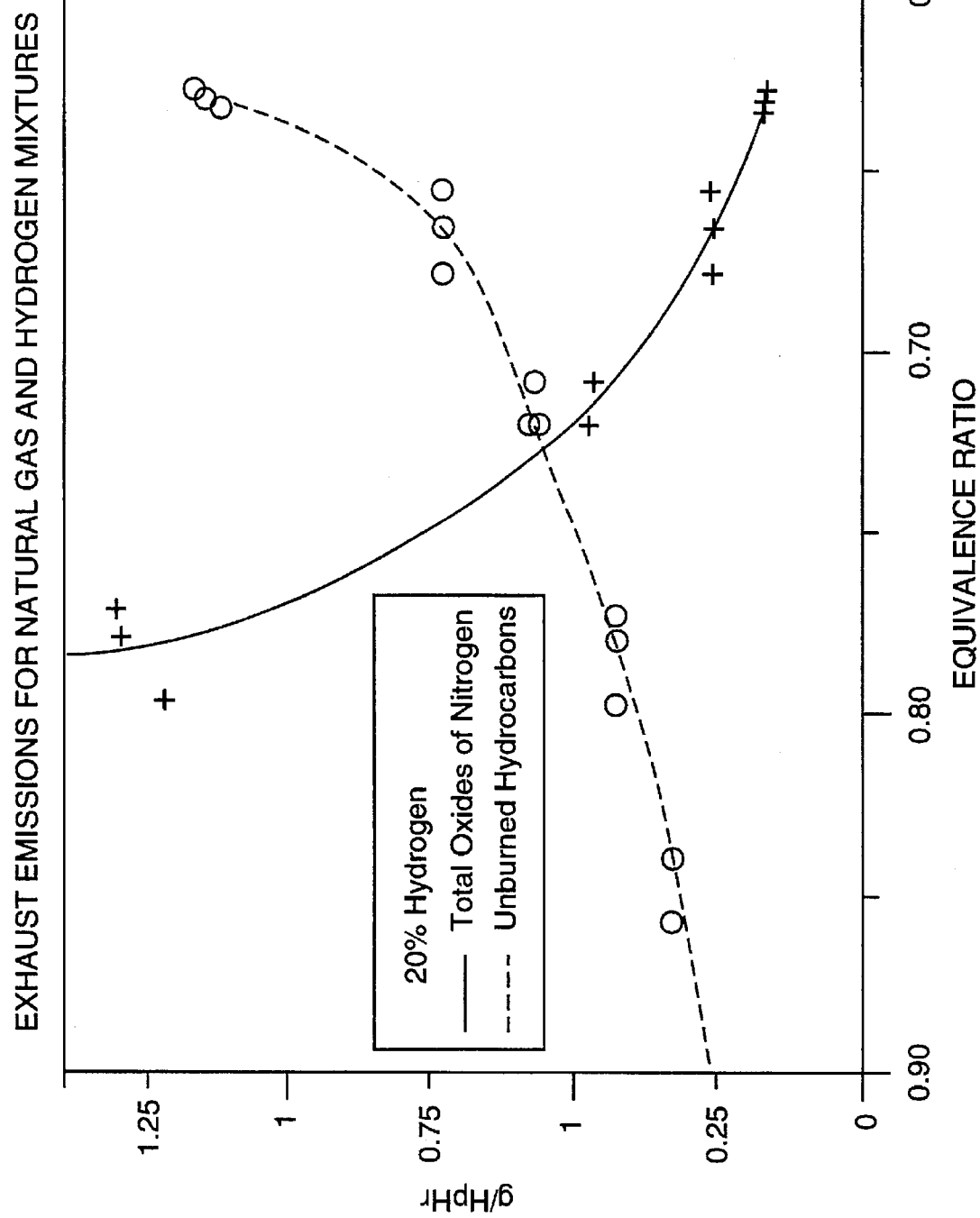
FIG. 12 shows an enlarged sectional graph of FIG. 11 of exhaust emissions for natural gas and 20% hydrogen mixtures in grams per horse power hour(g/HpHr) vs. Equivalence ratio.
Figure 13:
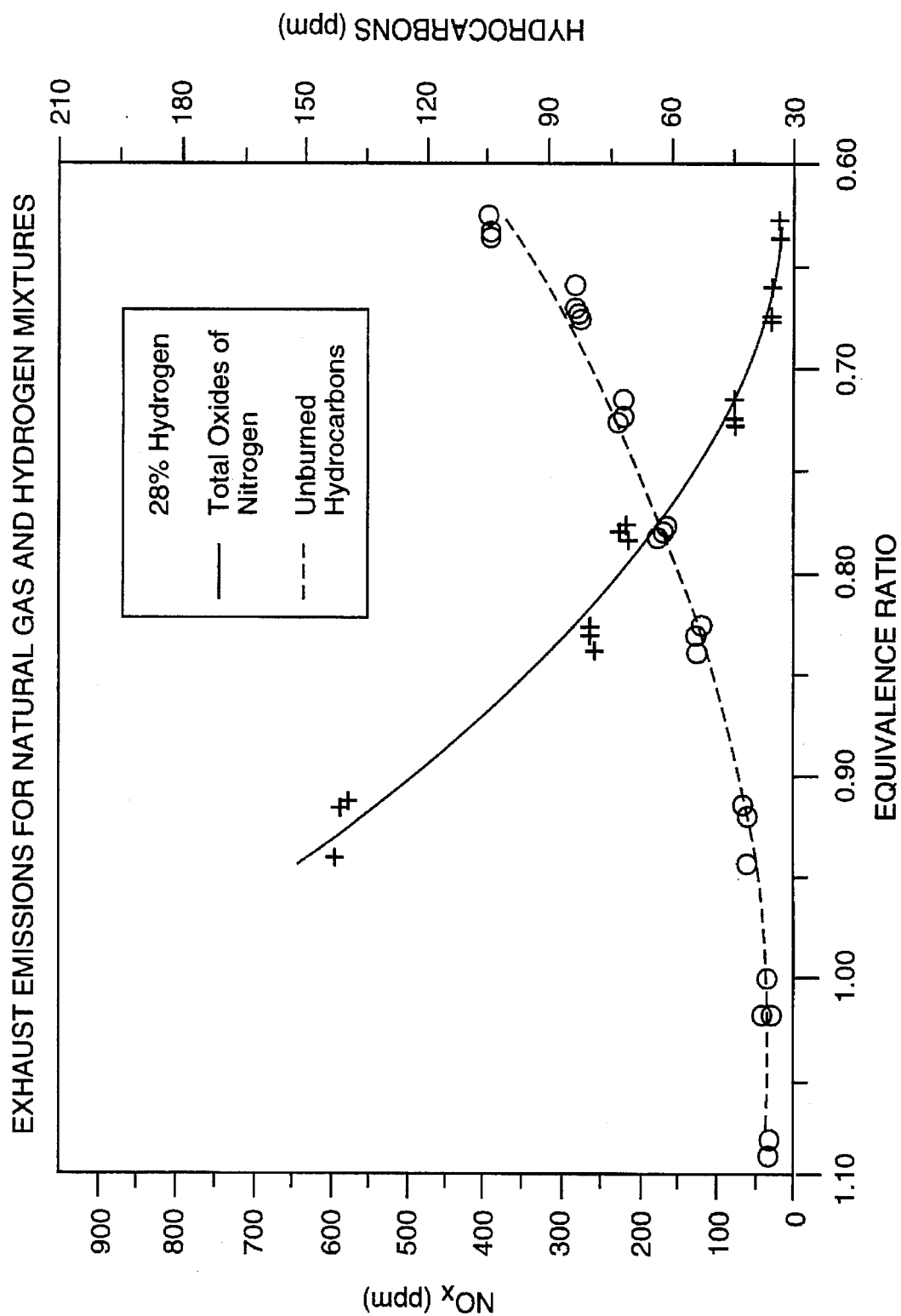
FIG. 13 shows a graph of exhaust emissions for natural gas and 28% hydrogen mixtures in parts per million(PPM) vs. Equivalence Ratio.
Figure 14:
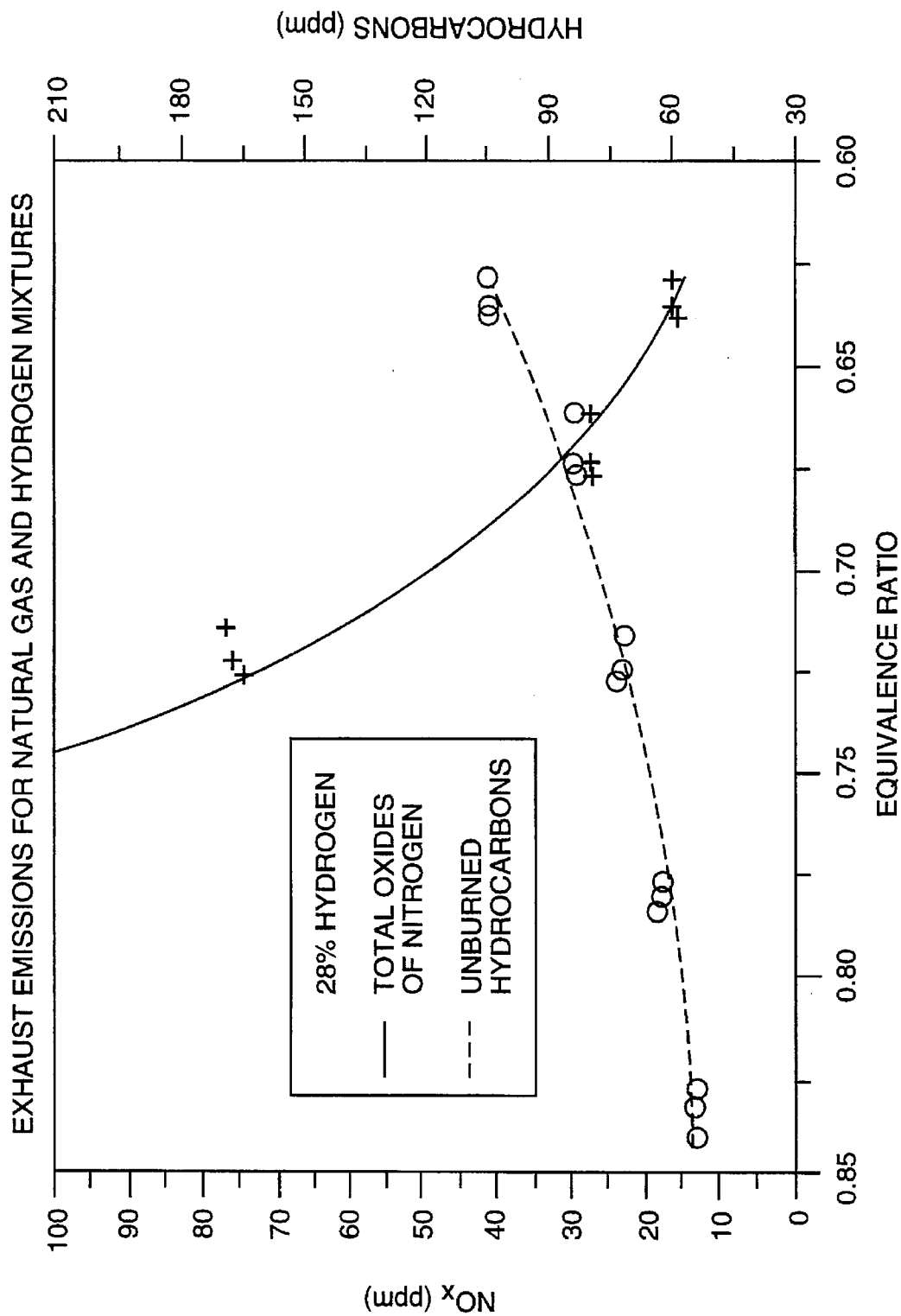
FIG. 14 shows an enlarged sectional graph of FIG. 13 of exhaust emissions for natural gas and 28% hydrogen mixtures in pans per million(PPM) vs. Equivalence Ratio.
Figure 15:
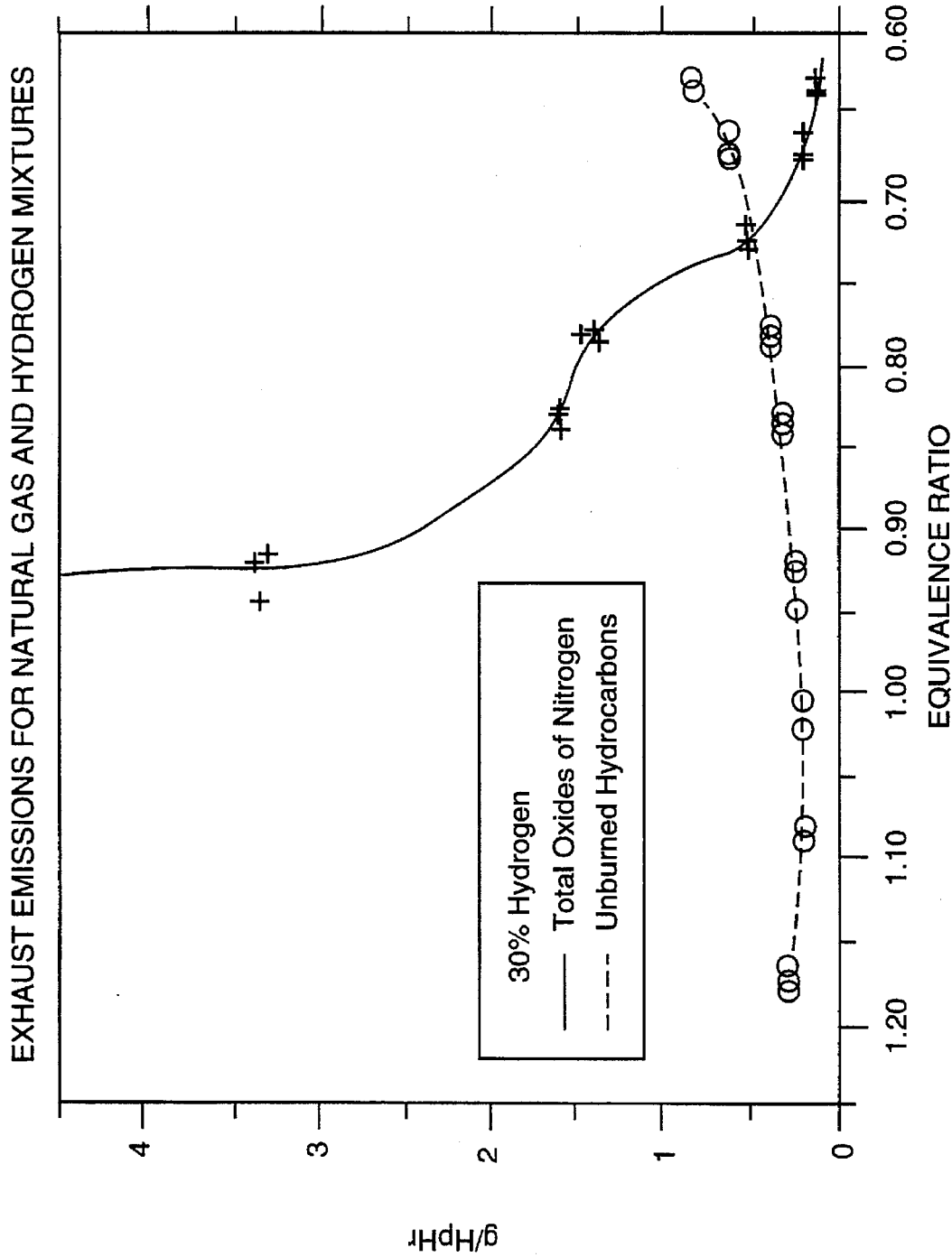
FIG. 15 shows a graph of exhaust emissions for natural gas and 30% hydrogen mixtures in grams per horse power hour(g/HpHr) vs. Equivalence ratio.
Figure 16:
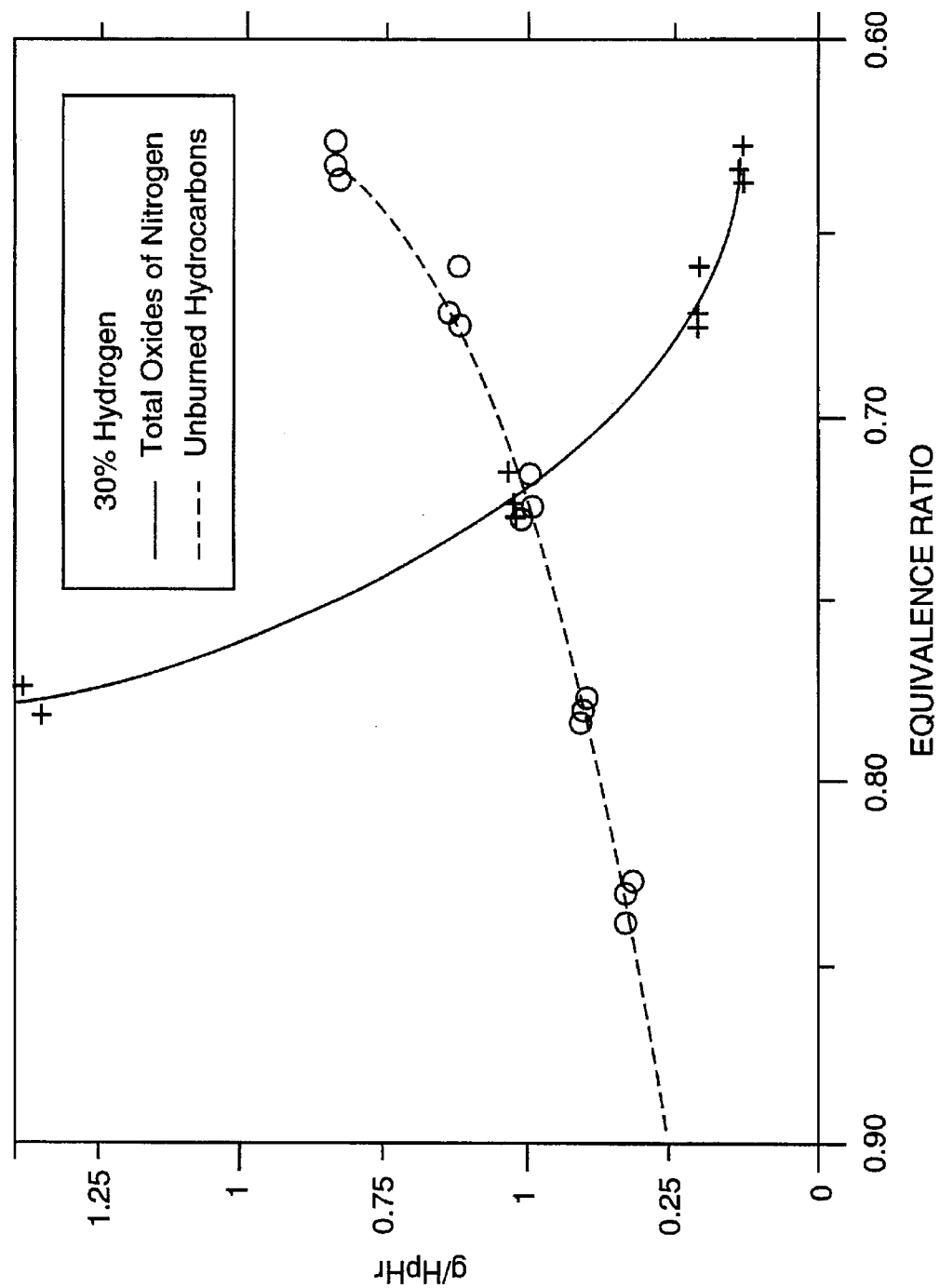
FIG. 16 shows an enlarged sectional graph of FIG. 15 of exhaust emissions for natural gas and 30% hydrogen mixtures in grams per horse power hour(g/HpHr) vs. Equivalence ratio.

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Tests were conducted with mixtures of hydrogen and natural gas. The fuels were mixed for the purpose of reducing emissions that are normally emitted by fossil fuels and to extend the lean combustion limit of natural gas by introducing hydrogen.

The engine used for these tests was a V-8, Chevrolet 350 which was rebuilt with the following specifications:
Bore: 4.030" (0.030 over bore from standard)
Stroke: 3.480"
Pistons: Cast Aluminum, Flat top with 4 valve reliefs
Cam: Stock
Cylinder heads: 76 cc
Valves: Intake 1.94"Exhaust 1.50"
Compression Ratio: 9:1
Intake Manifold: Aluminum Throttle Body
Exhaust Manifold: 1 ⅝" Steel pipe headers
Spark Plugs: Autolite: 303 Gap: 0.035"
Ignition: HEI with the vacuum spark advance removed
Wires: Carbon Core
Carburetor: Throttle body with Impco Gaseous fuel meter The dynamometer used in the tests was a Computer Controlled Super Flow 901 with a maximum torque specification of 1000 lb ft. The dynamometer was calibrated prior to the beginning of testing. In addition, the dynamometer was checked for calibration drift due to the heating of the strain gage and was re-zeroed between each pull.

For the emissions monitoring a NOVA Model Number 7550/B was used to measure CO, $CO_2$, $O_2$, NO, $NO_2$, $NO_x$. The instrument was modified by FSEC to output the results to an Analog to Digital Board mounted in an IBM-compatible 286 computer. The NOVA was calibrated using certified span gases. The NOVA was zeroed using room air and was spanned using 35 ppm certified $NO_2$ span gas, 1402 ppm N-Hexane (Hydrocarbon), 8.993% Carbon Monoxide and 17.490% Carbon Dioxide. The hydrocarbons measured in this testing were not speciated to determine the exact makeup of the total. It is generally known that approximately 80 to 90% of the total hydrocarbons are made up of methane hydrocarbons. The methane hydrocarbons are non photo-reactive and are generally not considered to be a significant pollutant.

The $NO_2$ span gas bottle contained a liner to prevent any reaction between the gas and the bottle. The instrument was checked for Zero drift before and after each test. In addition, the span was checked before and after each test sequence. Data was only accepted when both zero and span repeated within the limits of the instrumentation.

The emissions pickup tube was mounted in the collector pipe 14 inches from the primary pipes. Only stainless steel and Teflon tubing was used for exhaust gas delivery.

cylinder was monitored using a K type thermocouple mounted in an aluminum plate which was bolted between the head and the exhaust header. The thermocouples were mounted to take the exhaust temperature reading in the center of the exhaust stream.

For fuel flow, the mixture of CNG and hydrogen was fed into a Micro Motion Mass Flow Sensor, Model CMF 025. The Micro Motion Sensor operates using the coriolis effect, which negates the need for turbines and bearings thus substantially increasing the accuracy and repeatability of the gas flow measurements. The sensor was calibrated by Micro Motion and has a certified accuracy of 0.44% at a flow rate of 25 lbs per hour.

Each of the test runs were conducted at 17 horsepower and 1700 rpm. The testing was conducted at this level to simulate a light-duty truck traveling along a level paved road at 55 mph. Each of the five tests included a varying mixture level volumes of hydrogen with natural gas. The results of tests 1–5 are listed in tables 1–5 respectively.

TABLE 1

TEST 1. 0% HYDROGEN and 100% Natural Gas
Table One breaks down as follows
0% HYDROGEN

| TEST | A/F | FUEL % | EQUIV | CHG RPM | HP | ME | STDC TIMING | TOR-QUE | OIL TEMP | H2O TEMP | PPM NOX | PPM HC | PER-CENT O2 | A1 + A2 SCFM | NOX g/HpHr | HC g/HpHr |
|---|---|---|---|---|---|---|---|---|---|---|---|---|---|---|---|---|
| AAA-2 | 16 5 | 0 | 1 0424 | 1697 | 17 | 22 | 50 | 52 7 | 201 | 172 | 899 | 48 2 | 2 88 | 41 6 | 5 40 | 0 27 |
| AAA-1 | 16 6 | 0 | 1 0361 | 1695 | 17.1 | 23 | 50 | 53 1 | 202 | 172 | 899 | 48 8 | 2 88 | 42 | 5 41 | 0 26 |
| AAA-3 | 16.8 | 0 | 1 0238 | 1696 | 16 8 | 22 | 50 | 52 9 | 203 | 173 | 899 | 48 9 | 2 93 | 41 6 | 5 48 | 0 27 |
| AAB-2 | 17 | 0 | 1 0118 | 1696 | 17 | 22 | 49 | 52 5 | 206 | 172 | 899 | 47 6 | 3 37 | 42 6 | 5 52 | 0 26 |
| AAB-3 | 17 2 | 0 | 1 | 1894 | 17 | 22 | 49 | 52 5 | 206 | 171 | 899 | 46 8 | 3 38 | 42 4 | 5.49 | 0 26 |
| AAB-1 | 17 3 | 0 | 0 9942 | 1894 | 17 | 22 | 49 | 52 7 | 206 | 173 | 899 | 46 7 | 3 38 | 42 5 | 5 50 | 0 26 |
| AAC-2 | 18 7 | 0 | 0 9198 | 1700 | 16 8 | 22 | 51 | 52 1 | 206 | 172 | 592 5 | 56 2 | 5 2 | 46 1 | 3 54 | 0 34 |
| AAC-3 | 18 8 | 0 | 0 9149 | 1899 | 17 | 22 | 51 | 52 5 | 205 | 173 | 903 8 | 56 7 | 5 19 | 46 3 | 3 80 | 0 34 |
| AAC-1 | 19 1 | 0 | 0 9005 | 1700 | 17 | 22 | 51 | 52 5 | 204 | 173 | 808 9 | 55.2 | 5 17 | 46 2 | 3 82 | 0 33 |
| AAD-1 | 20 8 | 0 | 0 823 | 1697 | 18 8 | 22 | 51 | 52 | 204 | 172 | 182 3 | 89 5 | 6 64 | 50 5 | 1 20 | 0 48 |
| AAD-3 | 21 1 | 0 | 0 6152 | 1694 | 17 2 | 23 | 51 | 53 4 | 202 | 171 | 158 2 | 71 2 | 6.79 | 51 5 | 1 10 | 0 46 |
| AAD-2 | 21 3 | 0 | 0 8075 | 1694 | 17 2 | 23 | 51 | 53 1 | 203 | 172 | 183 5 | 68 4 | 6 64 | 51 9 | 1 21 | 0 45 |
| AAE-2 | 22 9 | 0 | 0 7511 | 1699 | 17 1 | 22 | 58 | 52 9 | 202 | 171 | 52 6 | 116 6 | 8 35 | 58 8 | 0.39 | 0 87 |
| AAE-3 | 23 | 0 | 0 7478 | 1700 | 17 3 | 23 | 58 | 53 5 | 202 | 172 | 50 7 | 115.5 | 8 34 | 58 2 | 0 38 | 0 86 |
| AAE-1 | 23 2 | 0 | 0 7434 | 1692 | 18 8 | 22 | 56 | 52 3 | 203 | 171 | 56 9 | 115 8 | 8 32 | 59 | 0 43 | 0 88 |
| AAF-1 | 23 9 | 0 | 0 7197 | 1699 | 15 5 | 20 | 58 | 47 9 | 199 | 172 | 32 1 | 184 4 | 8 21 | 82 6 | 0 28 | 1 81 |
| AAF-2 | 24 3 | 0 | 0 7078 | 1704 | 16 1 | 21 | 58 | 49 5 | 200 | 171 | 27 6 | 209 1 | 8 34 | 83 4 | 0 24 | 1 78 |
| AAF-3 | 24 4 | 0 | 0 7049 | 1704 | 15 7 | 21 | 56 | 48 5 | 199 | 171 | 26 4 | 211 3 | 8 33 | 83 2 | 0 23 | 1 84 |
| | AVE | 0% | | | | | | | | | | | | | | |

The following engine and atmospheric condition and monitoring equipment was utilized during testing and collected by the dynamometer: Oil Pressure, Exhaust Gas Temperature, Water Temperature, RPM, Torque, Barometric Pressure, Humidity, Carburetor Air Temp, Air, and Oil Temperature. The mass air flow was measured using a 6" calibrated turbine which was attached to the carburetor using a 6" sheet metal elbow. The exhaust gas temperature of each In Table 1, at an equivalence ratio of 1 on the stoichiometric scale, the $NO_x$ was beyond the scale of the NOVA instrument. At an equivalence ratio of 0.8333 the $NO_x$ has fallen sharply, however, the hydrocarbons were beginning to rise sharply. This was an indication that the engine is at or near the lean limit of combustion. Although a continuous reduction in the equivalence ratio yielded a sharp reduction in $NO_x$ the engine misfired.

TABLE 2

TEST 2. 11% HYDROGEN AND 89% Natural Gas
Table Two breaks down as follows:
11.4% HYDROGEN

| TEST | A/F | FUEL % | EQUIV | RPM | HP | ME | STDC TIMING | TOR-QUE | OIL TEMP | H2O TEMP | PPM NOX | PPM HC | PERCENT O2 | A1 + A2 SCFM | NOX g/HpHr | HC g/HpHr |
|---|---|---|---|---|---|---|---|---|---|---|---|---|---|---|---|
| ABA-2 | 14.2 | 10.7 | 1 2324 | 1700 | 17.1 | 22 | 35 | 52 7 | 212 | 172 | 489.2 | 90 8 | 0 51 | 37 8 | 2 31 | 0 30 |
| ABA-1 | 14.4 | 10 7 | 1 2153 | 1703 | 17 | 22 | 35 | 52 4 | 211 | 172 | 454.8 | 61 1 | 0.5 | 38 | 2 28 | 0 30 |
| ABA-3 | 14 5 | 10 7 | 1 2088 | 1896 | 17.1 | 23 | 35 | 53.1 | 212 | 172 | 481.7 | 61 3 | 0 52 | 37 9 | 2 42 | 0 30 |
| ABB-1 | 15.3 | 11.2 | 1 1438 | 1700 | 18 9 | 22 | 40 | 52.3 | 212 | 174 | 899.5 | 49 4 | 1.28 | 38 1 | 5 00 | 0 25 |
| ABB-2 | 15 5 | 11.3 | 1 129 | 1699 | 18 8 | 22 | 40 | 52 | 212 | 174 | 899 5 | 50 6 | 1.27 | 38 2 | 5 04 | 0 25 |
| ABB-3 | 15 6 | 11 5 | 1 1218 | 1899 | 17 | 22 | 40 | 52 4 | 213 | 174 | 809 5 | 48 7 | 1 31 | 38 3 | 4 99 | 0 24 |
| ABC-3 | 17.2 | 11.8 | 1 0174 | 1700 | 17 | 22 | 40 | 52.4 | 209 | 172 | 854 4 | 41 8 | 3.32 | 41 8 | 4 80 | 0 23 |
| ABC-1 | 17 6 | 11.9 | 0 9943 | 1696 | 17 1 | 22 | 40 | 53 | 209 | 174 | 867 2 | 41.8 | 3 41 | 41 8 | 4 99 | 0 22 |
| ABC-2 | 17 8 | 11.8 | 0 9943 | 1700 | 17.1 | 22 | 40 | 52 7 | 209 | 174 | 862.2 | 42.2 | 3 35 | 42 1 | 4 67 | 0 23 |
| ABD-1 | 19 6 | 11 7 | 0 8929 | 1899 | 17 1 | 23 | 41 | 53 | 208 | 173 | 254 8 | 52 1 | 5.48 | 46 6 | 1 52 | 0 31 |
| ABD-2 | 19 6 | 11 8 | 0 8929 | 1897 | 17 1 | 22 | 41 | 52 9 | 207 | 172 | 258 3 | 52 1 | 5 47 | 46 | 1 53 | 0 31 |
| ABD-3 | 19 6 | 11 8 | 0 8929 | 1897 | 17 2 | 23 | 41 | 55 2 | 207 | 171 | 258 4 | 51 9 | 5 48 | 48 5 | 1 53 | 0 31 |
| ABE-2 | 20 6 | 11 6 | 0 3495 | 1701 | 17 2 | 23 | 44 | 53 1 | 205 | 172 | 157 6 | 81 4 | 8 5 | 48 5 | 0 97 | 0 38 |
| ABE-1 | 20.7 | 11 8 | 0 8454 | 1703 | 17 1 | 22 | 44 | 52.7 | 207 | 171 | 168 8 | 81 5 | 8.44 | 48 8 | 1 05 | 0 38 |
| ABE-3 | 20 9 | 11 6 | 0 8373 | 1700 | 17.1 | 22 | 44 | 52 7 | 205 | 173 | 173 7 | 80 8 | 8 41 | 48 7 | 1 08 | 0 38 |
| ABF-3 | 22 9 | 11 5 | 0 7642 | 1698 | 17 2 | 23 | 45 | 53 2 | 203 | 171 | 46 1 | 76 1 | 8.02 | 55 3 | 0 32 | 0 53 |
| ABF-1 | 23 | 11 5 | 0 7608 | 1701 | 18 9 | 22 | 45 | 52 1 | 206 | 172 | 44 6 | 78 5 | 8 08 | 55.1 | 0 32 | 0 54 |
| ABF-2 | 23.4 | 11.5 | 0 7479 | 1698 | 17 1 | 22 | 45 | 52 8 | 205 | 171 | 43 4 | 77 2 | 8 05 | 55 5 | 0 31 | 0 54 |
| ABG-2 | 25.9 | 11 5 | 0 8757 | 1701 | 17 1 | 22 | 55 | 52 7 | 202 | 171 | 23 2 | 138.2 | 8.50 | 83 7 | 0 18 | 1 11 |
| ABG-1 | 26 | 11 5 | 0 6731 | 1706 | 17.1 | 22 | 55 | 52 5 | 204 | 171 | 23 4 | 142 6 | 9 85 | 83 9 | 0 18 | 1 15 |
| ABG-3 | 26 3 | 11 5 | 0 8854 | 1706 | 17 | 22 | 55 | 52 3 | 202 | 172 | 24 3 | 140 6 | 9 61 | 83 5 | 0 20 | 1.13 |
| AVE | | 11 4% | | | | | | | | | | | | | | |

This test in Table 2 began at an equivalence ratio of 1.25. The $NO_x$ was approximately 450 ppm. The $NO_x$ climbed rapidly as the air to fuel mixture was leaned out. At an equivalence ratio of approximately 1.1 the $NO_x$ had risen beyond the instrument capability. At stoichiometric (an equivalence ratio of 1) the $NO_x$ is beginning to fall sharply and is reduced from that observed with no hydrogen added. As this mixture is leaned out further, the $NO_x$ continues to fail significantly, and the hydrocarbons again began to rise sharply. However, the slope is less than that noted on pure natural gas. Test 2 was terminated at an equivalence of 0.666. Although the engine did not appear to be at the lean limit, the hydrocarbons had risen beyond acceptable limits.

TABLE 3

TEST 3. 20% HYDROCARBON AND 80% Natural Gas
Table Three breaks down as follows:
19.9% HYDROGEN

| TEST | A/F | FUEL % | EQUIV | RPM | HP | ME | STDC TIMING | TOR-QUE | OIL TEMP | H2O TEMP | PPM NOX | PPM HC | PERCENT O2 | A1 + A2 SCFM | NOX g/HpHr | HC g/HpHr |
|---|---|---|---|---|---|---|---|---|---|---|---|---|---|---|---|
| ACA-2 | 15 | 19 7 | 1 1833 | 1700 | 17 | 22 | 35 | 52 5 | 212 | 172 | 827 5 | 52 7 | 0 81 | 37 5 | 4 05 | 0 28 |
| ACA-1 | 15 1 | 19 5 | 1 1755 | 1702 | 17 | 22 | 35 | 52 4 | 213 | 174 | 824 7 | 54 8 | 0 83 | 37 5 | 4 04 | 0 27 |
| ACA 3 | 15 3 | 19 8 | 1 1801 | 1705 | 17 | 22 | 35 | 52 4 | 212 | 174 | 827 6 | 53 3 | 0 82 | 37 6 | 4 08 | 0 28 |
| ACB-2 | 17.7 | 19 8 | 1 0028 | 1898 | 17 2 | 23 | 39 | 53 2 | 210 | 172 | 898 5 | 41 1 | 3 81 | 42 1 | 5 38 | 0 22 |
| ACB-3 | 17 9 | 19 9 | 0 9916 | 1701 | 17 2 | 23 | 39 | 53 | 210 | 172 | 998 5 | 41 8 | 3 68 | 42 | 5 36 | 0 22 |
| ACB-1 | 18 | 19 8 | 0 9861 | 1896 | 17 3 | 23 | 39 | 53 4 | 212 | 172 | 899 5 | 41 1 | 3 83 | 42 3 | 5 37 | 0 22 |
| ACC-1 | 19 2 | 19 9 | 0 9245 | 1701 | 17 | 22 | 43 | 52 5 | 210 | 173 | 775 1 | 47 3 | 4 96 | 44 8 | 4 47 | 0 27 |
| ACC-3 | 19 4 | 20 | 0 9149 | 1700 | 17 | 22 | 43 | 52 4 | 209 | 173 | 773 3 | 46 6 | 4 89 | 44 3 | 4 41 | 0 27 |
| ACC-2 | 19 5 | 20 | 0 9103 | 1899 | 17 | 22 | 43 | 52 6 | 210 | 173 | 802.7 | 46 9 | 4 84 | 44 7 | 4 82 | 0 27 |
| ACD-2 | 20 7 | 18 9 | 0 8575 | 1896 | 17 1 | 22 | 45 | 52 9 | 208 | 173 | 292 5 | 55 6 | 8 18 | 47 3 | 1 77 | 0 34 |
| ACD-1 | 21 1 | 20 | 0 8412 | 1701 | 17 1 | 22 | 45 | 52 7 | 207 | 172 | 300 7 | 55 8 | 8 16 | 47 3 | 1 81 | 0 34 |
| ACD-3 | 21 1 | 20 | 0 8412 | 1898 | 17 | 22 | 45 | 52 4 | 206 | 172 | 288 5 | 55 8 | 8 16 | 47 3 | 1 75 | 0 34 |
| ACE-3 | 22 2 | 20 | 0 7995 | 1700 | 17 | 22 | 51 | 52 5 | 206 | 173 | 189 9 | 88 5 | 7 42 | 50 3 | 1 22 | 0 43 |
| ACE-2 | 22 7 | 20 | 0 7819 | 1898 | 17.1 | 23 | 51 | 53 | 205 | 172 | 200 2 | 85 8 | 7 35 | 51 | 1 30 | 0 43 |
| ACE-1 | 22 8 | 20 | 0 7751 | 1898 | 17 | 22 | 51 | 52 6 | 206 | 171 | 200 7 | 85 8 | 7 34 | 50 9 | 1 31 | 0 43 |
| ACF-2 | 24 6 | 20 1 | 0 7215 | 1897 | 17 1 | 22 | 55 | 52 9 | 204 | 170 | 87 9 | 81 1 | 8 63 | 55 1 | 0 47 | 0 57 |
| ACF-3 | 24 6 | 20 | 0 7215 | 1898 | 16.9 | 22 | 55 | 52 3 | 203 | 171 | 86 8 | 81 7 | 8 86 | 55 2 | 0 47 | 0 58 |
| ACF-1 | 25 | 20 | 0 71 | 1898 | 17 | 22 | 55 | 52 7 | 204 | 172 | 86 1 | 80 9 | 8 63 | 55 5 | 0 47 | 0 57 |
| ACG-2 | 26 1 | 20 | 0 6801 | 1899 | 17.1 | 22 | 58 | 52 8 | 202 | 171 | 34 8 | 96 3 | 9 49 | 80 2 | 0 27 | 0 73 |
| ACG-3 | 26 8 | 20 | 0 6673 | 1697 | 17 | 22 | 50 | 52 6 | 202 | 172 | 34 3 | 86 7 | 9 48 | 59 7 | 0 28 | 0 73 |
| ACG-1 | 27 | 20 | 0 6574 | 1899 | 17 | 22 | 59 | 52 7 | 203 | 172 | 35 1 | 86 8 | 9 46 | 59 9 | 0 27 | 0 74 |
| ACH-1 | 27 9 | 20 | 0 6382 | 1700 | 16 | 21 | 60+ | 49 3 | 200 | 171 | 20 7 | 132.3 | 10 15 | 63 2 | 0 18 | 1 13 |

TABLE 3-continued

TEST 3. 20% HYDROCARBON AND 80% Natural Gas
Table Three breaks down as follows:
19.9% HYDROGEN

| TEST | A/F | FUEL % | EQUIV | RPM | HP | ME | STDC TIMING | TORQUE | OIL TEMP | H2O TEMP | PPM NOX | PPM HC | PERCENT O2 | A1+A2 SCFM | NOX g/HpHr | HC g/HpHr |
|---|---|---|---|---|---|---|---|---|---|---|---|---|---|---|---|
| ACH-2 | 28 | 20 | 0 6339 | 1708 | 16 5 | 22 | 60+ | 50 8 | 201 | 171 | 20 6 | 137 8 | 10 15 | 64 | 0 17 | 1 15 |
| ACH-3 | 28 1 | 20 | 0 6317 | 1703 | 16 2 | 21 | 80+ | 49 9 | 200 | 172 | 18 9 | 137 2 | 10 19 | 64 3 | 0 17 | 1 17 |
| | | AVE 19 9% | | | | | | | | | | | | | | |

In Test 3 at stoichiometric, the $NO_x$ is again beyond the limit of the measurement instrumentation. At an equivalence ratio of 0.95 (slightly lean) the $NO_x$ falls sharply. The $NO_x$ continues to fall as the equivalence ratio is reduced to a value of 0.625, where the test was terminated. The test was terminated because the engine again appeared to be missing and was apparently beyond the drivable limits.

ratio of 0.95. When the air to fuel ratio was leaned to an equivalence of 0.87, the $NO_x$ dropped sharply. The test was again terminated at an equivalence ratio of approximately 0.625 where the $NO_x$ was measured to be approximately 16.5 ppm.

The engine was again observed to be missing although in cylinder pressure readings were not taken to confirm this

TABLE 4

TEST 4. 28% HYDROGEN AND 72% Natural Gas
Table Four breaks down as follows:
28.3% HYDROGEN

| TEST | A/F | FUEL % | EQUIV | RPM | HP | ME | STDC TIMING | TORQUE | OIL TEMP | H2O TEMP | PPM NOX | PPM HC | PERCENT O2 | A1+A2 SCFM | NOX g/HpHr | HC g/HpHr |
|---|---|---|---|---|---|---|---|---|---|---|---|---|---|---|---|
| ADA-3 | 15 3 | 28 1 | 1 1791 | 1701 | 18.8 | 22 | 36 | 52 | 209 | 173 | 899 | 52 3 | 0 8 | 38 | 5 01 | 0 26 |
| ADA-2 | 15.4 | 28 2 | 1 1714 | 1700 | 18 9 | 22 | 36 | 52 1 | 209 | 172 | 899 | 52 7 | 0 89 | 37 8 | 4 95 | 0 26 |
| ADA-1 | 15 5 | 28 | 1 1639 | 1703 | 16.8 | 22 | 36 | 51 9 | 210 | 173 | 899 | 54 6 | 0 88 | 37 8 | 4 96 | 0 27 |
| ADB-3 | 16 6 | 28 1 | 1 0687 | 1899 | 17 | 22 | 36 | 52 6 | 209 | 172 | 899 | 34 7 | 2 06 | 39 | 5 06 | 0 18 |
| ADB-1 | 16 7 | 28 1 | 1 0802 | 1702 | 17 | 22 | 38 | 52 4 | 210 | 173 | 899 | 34 8 | 2 01 | 39 3 | 5 09 | 0 18 |
| ADB-2 | 16 7 | 28.2 | 1 0802 | 1702 | 17 | 22 | 38 | 52 5 | 211 | 171 | 899 | 34 6 | 2 04 | 39 3 | 5 09 | 0 18 |
| ADC-1 | 17.7 | 28 | 1.0192 | 1702 | 17 2 | 23 | 39 | 53 1 | 209 | 172 | 899 | 35 2 | 3 38 | 41 7 | 5 33 | 0 19 |
| ADC-3 | 17 7 | 28 1 | 1 0182 | 1703 | 17 1 | 22 | 39 | 52 8 | 209 | 174 | 899 | 36 8 | 3 38 | 41 7 | 5 36 | 0 20 |
| ADC-2 | 18 | 28.2 | 1.0022 | 1899 | 17 3 | 23 | 39 | 53 4 | 207 | 174 | 899 | 35 7 | 3 38 | 41 9 | 5 32 | 0 19 |
| ADD-2 | 19 1 | 28 2 | 0 9445 | 1702 | 18 9 | 22 | 39 | 52 3 | 207 | 173 | 584 8 | 40 6 | 5 | 44 | 3 33 | 0 23 |
| ADD-1 | 19 6 | 28 3 | 0 9204 | 1702 | 18 8 | 22 | 39 | 52 | 206 | 173 | 580 8 | 40 7 | 5 01 | 44 4 | 3 36 | 0 24 |
| ADD-3 | 19 7 | 28 2 | 0 9157 | 1703 | 17 | 22 | 39 | 52 4 | 207 | 171 | 573 3 | 41 7 | 5 | 44 7 | 3 30 | 0 24 |
| ADE-3 | 21 5 | 28 3 | 0 8391 | 1701 | 17 | 22 | 41 | 52 6 | 204 | 172 | 252 6 | 53 | 6 54 | 48 6 | 1 57 | 0 33 |
| ADE-1 | 21 7 | 28 4 | 0 8313 | 1700 | 17 | 22 | 41 | 52 6 | 203 | 171 | 258 1 | 53 2 | 6 57 | 48 6 | 1 59 | 0 33 |
| ADE-2 | 21 8 | 28 4 | 0 8275 | 1703 | 17 2 | 23 | 41 | 53 | 205 | 171 | 257 1 | 52 3 | 6 55 | 48 5 | 1 58 | 0 32 |
| ADF-2 | 23 | 28 5 | 0 7843 | 1703 | 17.1 | 22 | 50 | 52 6 | 202 | 171 | 208 4 | 62 6 | 7.53 | 51 2 | 1 36 | 0 41 |
| ADF-3 | 23 1 | 28 4 | 0 781 | 1702 | 17 | 22 | 50 | 52 6 | 203 | 172 | 220 6 | 61 6 | 7 53 | 51 4 | 1 45 | 0 40 |
| ADF-1 | 23 2 | 28 4 | 0 7776 | 1703 | 17 1 | 22 | 50 | 52 6 | 202 | 172 | 211 8 | 61 1 | 7 52 | 51 6 | 1 39 | 0 40 |
| ADG-2 | 24 8 | 28.5 | 0 7274 | 1700 | 17 | 22 | 52 | 52 5 | 202 | 171 | 74 1 | 72 4 | 8 59 | 55 1 | 0 52 | 0 51 |
| ADG-3 | 24 9 | 28 5 | 0 7245 | 1701 | 17 1 | 22 | 52 | 52 6 | 200 | 171 | 75 5 | 71 4 | 8 58 | 54 7 | 0 52 | 0 49 |
| ADG-1 | 25 2 | 28 5 | 0 7159 | 1703 | 17 | 22 | 52 | 52 3 | 201 | 171 | 76 4 | 71.1 | 8 56 | 54 9 | 0 53 | 0 50 |
| ADH-3 | 26 7 | 28 5 | 0 6757 | 1701 | 17 1 | 22 | 54 | 52 7 | 198 | 171 | 26 9 | 82 5 | 8 54 | 80 | 0 20 | 0 63 |
| ADH-2 | 26 8 | 28 4 | 0 6731 | 1701 | 17 | 22 | 54 | 52 8 | 200 | 172 | 27 3 | 83 1 | 8 54 | 80 1 | 0 21 | 0 63 |
| ADH-1 | 27 3 | 28 5 | 0 6608 | 1703 | 17 2 | 23 | 54 | 53 | 199 | 171 | 27 3 | 83 1 | 8 55 | 80 | 0 21 | 0 63 |
| ADI-1 | 28 3 | 28.5 | 0 6375 | 1701 | 17 | 22 | 58 | 52 8 | 198 | 170 | 15 9 | 104 1 | 10 27 | 83 6 | 0 13 | 0 94 |
| ADI-3 | 28 4 | 28 5 | 0 6352 | 1896 | 16.9 | 22 | 58 | 52 4 | 197 | 171 | 16 7 | 104 2 | 10 27 | 83 8 | 0 14 | 0 85 |
| ADI-2 | 28 7 | 28 5 | 0 6286 | 1899 | 17 | 22 | 58 | 52 5 | 199 | 171 | 16 5 | 104 4 | 10 27 | 83 8 | 0 13 | 0 84 |
| | | AVE 28 3% | | | | | | | | | | | | | | |

In Test 4, at stoichiometric, the $NO_x$ is again beyond the limit of the measurement instrumentation and remained beyond the limit of the instrumentation at an equivalence fact. Notice that the hydrocarbons were found to be 104 ppm.

TABLE 5

TEST 5. 36% HYDROGEN AND 64% Natural Gas
Table Five breaks down as follows:
36.0% HYDROGEN

| TEST | A/F | FUEL % | EQUIV | RPM | HP | ME | STDC TIMING | TOR- QUE | OIL TEMP | H2O TEMP | PPM NOX | PPM HC | PER- CENT O2 | A1 + A2 SCFM | NOX g/HpHr | HC g/HpHr |
|---|---|---|---|---|---|---|---|---|---|---|---|---|---|---|---|
| AEA-1 | 16   | 35.9 | 1 1475 | 1704 | 16.9 | 22 | 35 | 52   | 213 | 174 | 899   | 40 8  | 1 16  | 38   | 4 87 | 0 20 |
| AEA-3 | 16   | 36   | 1.1475 | 1899 | 17 1 | 23 | 35 | 53   | 213 | 173 | 899   | 41 1  | 1.13  | 38 3 | 4 95 | 0 20 |
| AEA-2 | 16.1 | 36   | 1 1404 | 1704 | 16.6 | 22 | 35 | 51 3 | 211 | 174 | 899   | 42 8  | 1 15  | 37 9 | 5 04 | 0 22 |
| AEB-2 | 18.1 | 36   | 1.0144 | 1704 | 17   | 22 | 37 | 52 4 | 207 | 174 | 899   | 32 8  | 3 71  | 41 9 | 5 41 | 0 18 |
| AEB-1 | 18.5 | 36 1 | 0 9924 | 1701 | 17   | 22 | 37 | 52 4 | 208 | 174 | 899   | 32 1  | 3 7   | 41 8 | 5 38 | 0 17 |
| AEB-3 | 18 6 | 35 9 | 0.9871 | 1703 | 17   | 22 | 37 | 52 5 | 207 | 173 | 899   | 33 1  | 3 71  | 42 1 | 5 43 | 0 18 |
| AEC-3 | 20   | 36   | 0 916  | 1703 | 17   | 22 | 38 | 52 4 | 206 | 172 | 475 3 | 38 9  | 5 41  | 45 4 | 2 77 | 0 23 |
| AEC-1 | 20.3 | 35 9 | 0 9044 | 1706 | 16 9 | 22 | 38 | 52   | 206 | 173 | 483.3 | 38.5  | 5.39  | 45 5 | 2.80 | 0 23 |
| AEC-2 | 20.5 | 35.9 | 0 8956 | 1705 | 17.1 | 22 | 38 | 52 6 | 205 | 172 | 481 5 | 38.5  | 5 38  | 45 5 | 2 85 | 0 22 |
| AED-2 | 22   | 36   | 0 8345 | 1704 | 17   | 22 | 43 | 52 5 | 203 | 173 | 385.1 | 50 8  | 6 7   | 48 9 | 2 41 | 0 32 |
| AED-1 | 22 1 | 35 9 | 0 8306 | 1702 | 17   | 22 | 43 | 52 4 | 203 | 172 | 367 9 | 50 1  | 6 89  | 48 7 | 2 42 | 0 31 |
| AED-3 | 22.2 | 35 9 | 0 827  | 1703 | 17   | 22 | 43 | 52 4 | 204 | 172 | 385 5 | 50 1  | 6 68  | 48 8 | 2 47 | 0 31 |
| AEE-3 | 23.2 | 36   | 0 7914 | 1705 | 17   | 22 | 44 | 52 5 | 201 | 171 | 204 1 | 58 4  | 7 53  | 51 1 | 1 33 | 0 38 |
| AEE-2 | 23 3 | 36   | 0 788  | 1705 | 17 1 | 22 | 44 | 52 6 | 203 | 172 | 206 7 | 58 2  | 7.54  | 51.2 | 1 34 | 0 38 |
| AEE-1 | 23 4 | 35 9 | 0 7846 | 1702 | 17   | 22 | 44 | 52 6 | 203 | 173 | 202 6 | 58 4  | 7.58  | 51   | 1 32 | 0 38 |
| AEG-3 | 25   | 35 9 | 0 7344 | 1702 | 17   | 22 | 49 | 52 4 | 200 | 172 | 78 8  | 68    | 8 82  | 54 9 | 0 55 | 0 48 |
| AEG-2 | 25 2 | 36   | 0 7286 | 1703 | 17 1 | 22 | 49 | 52 6 | 200 | 170 | 77 7  | 67 4  | 8 82  | 54 8 | 0 54 | 0 47 |
| AEG-1 | 25 5 | 35 9 | 0 72   | 1702 | 17   | 22 | 49 | 52 5 | 202 | 172 | 76 9  | 68 4  | 8 85  | 54 8 | 0 54 | 0 48 |
| AEH-1 | 29 5 | 35 9 | 0 6224 | 1707 | 17   | 22 | 50 | 52 1 | 199 | 470 | 12 4  | 105 5 | 10 83 | 64 8 | 0 10 | 0 87 |
| AEH-2 | 29 5 | 35 9 | 0 6224 | 1704 | 16 8 | 22 | 50 | 51 9 | 198 | 172 | 11 7  | 104 1 | 10 64 | 65   | 0 10 | 0 87 |
| AEH-3 | 29 5 | 36   | 0 6224 | 1703 | 17 2 | 22 | 50 | 52 9 | 199 | 172 | 11 9  | 102 7 | 10 6  | 64 8 | 0 10 | 0 83 |
| AVE |  | 36.0% |  |  |  |  |  |  |  |  |  |  |  |  |  |  |

In Test 5 at stoichiometric, the $NO_x$ levels were beyond the measurement limit of the instrumentation. The $NO_x$ levels dropped sharply at an equivalence ratio of 0.91. The $NO_x$ levels continue to fall to the termination of the test at approximately 0.625 equivalence ratio. The $NO_x$ has a low value of approximately 12 ppm. The hydrocarbons have a maximum value of 105 ppm. This is approximately the same as the hydrocarbons measured during the 30% hydrogen testing. The test was terminated before there was a sharp rise in the hydrocarbons thus indicating that the roughness was not being caused by running the engine beyond the lean limit.

SUMMARY OF TESTS 1–5

The purpose of TESTS 1 through 5 was to determine if the lean limit of Natural Gas can be extended by introducing Hydrogen, $H_2$. The hypothesis used was that the leaner the engine could be run without going into lean misfire, the lower the $NO_x$ would be while only incurring moderate increases in the Hydro Carbons, HCs. HCs were not considered to be a significant problem since HCs can be reduced using catalysts.

FIGS. 1 through 20 show partial maps of the $NO_x$ and hydrocarbon emissions at various levels of hydrogen in Natural Gas and at various equivalence ratios.

Both 28% hydrogen and 36% hydrogen mixtures yielded very low $NO_x$ levels a to 0.625 equivalence ratio. See FIGS. 13–20. The extremely low $NO_x$ levels of 28 ppm (0.21 gm/hp hr) and 12 ppm(0.10 gm/hp hr) respectively were unexpected. Recall that all of the emissions readings were taken at the exhaust manifold outlet. There were no emission control equipment on the tested engine and there was no catalytic converter. The levels of $NO_x$ at 28% and 36% hydrogen mixtures were substantially below the strictest air quality standards. For example, current air quality standards in Japan require $NO_x$ emissions to be below 200 ppm. This standard is extremely difficult to meet and has never been met without substantial emissions control equipment on the engine, based on the prior art known to the inventors.

Figure 17:
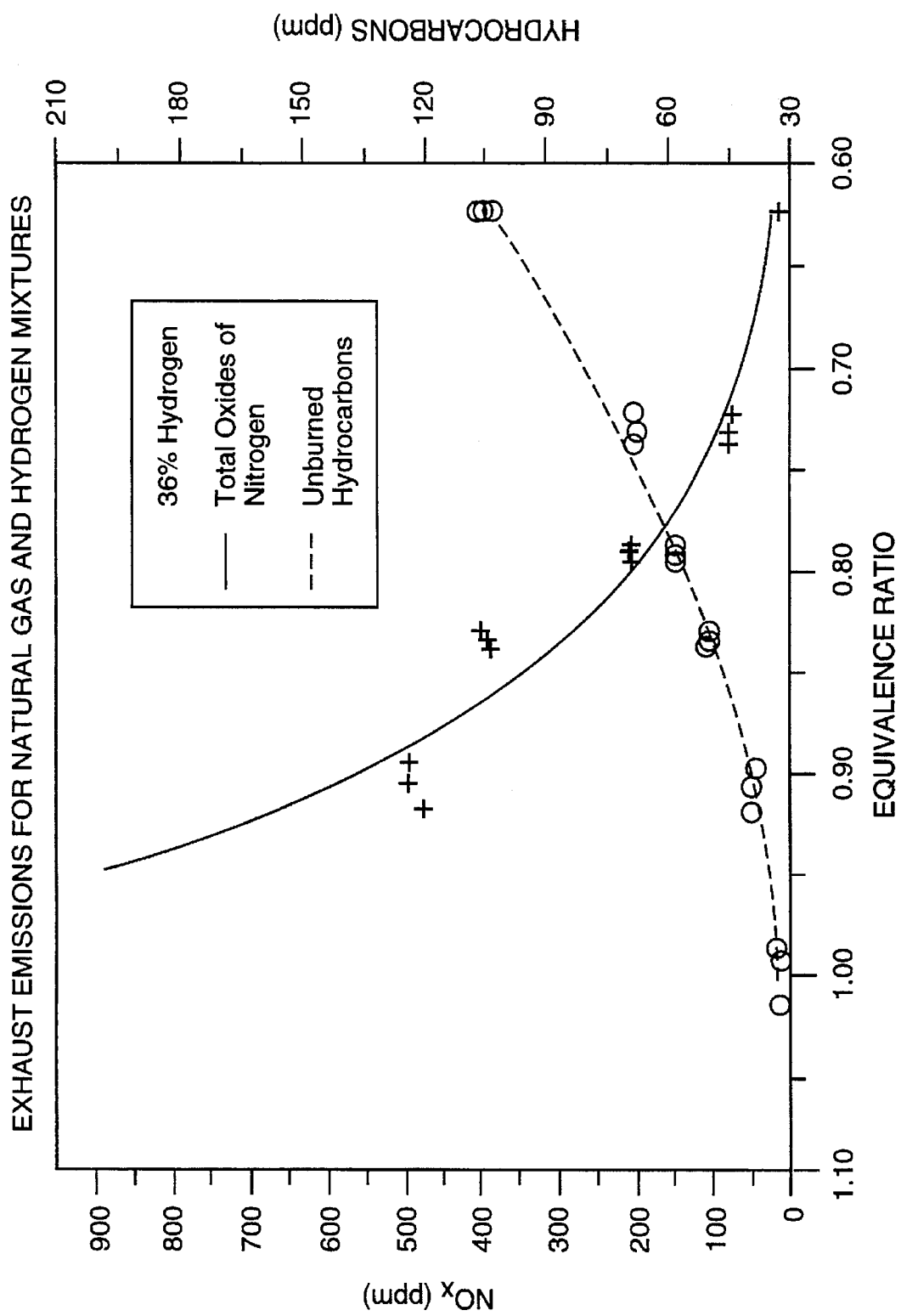
FIG. 17 shows a graph of exhaust emissions for natural gas and 36% hydrogen mixtures in parts per million(PPM) vs. Equivalence Ratio.
Figure 18:
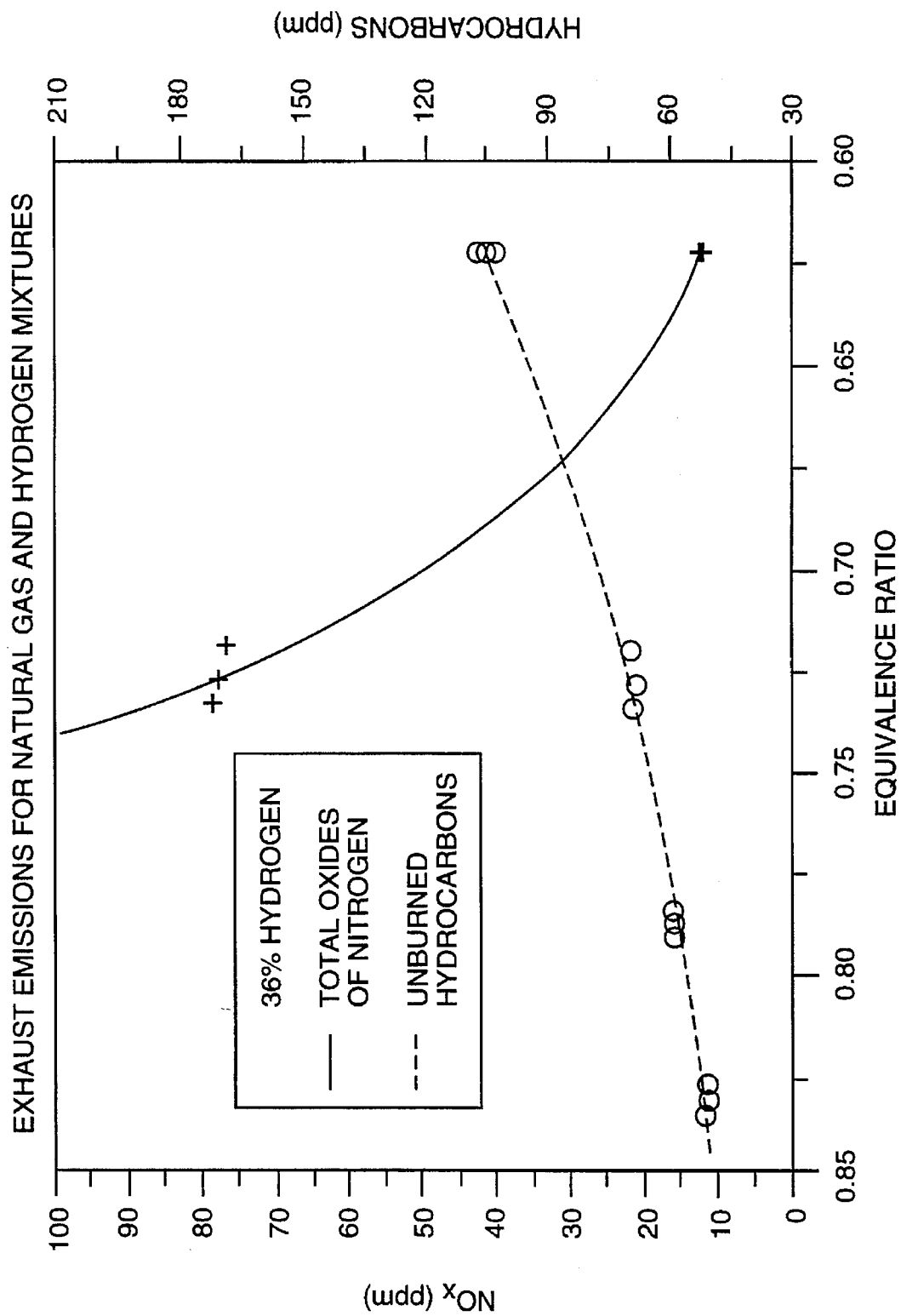
FIG. 18 shows an enlarged sectional graph of FIG. 17 of exhaust emissions for natural gas and 36% hydrogen mixtures in parts per million(PPM) vs. Equivalence Ratio.
Figure 19:
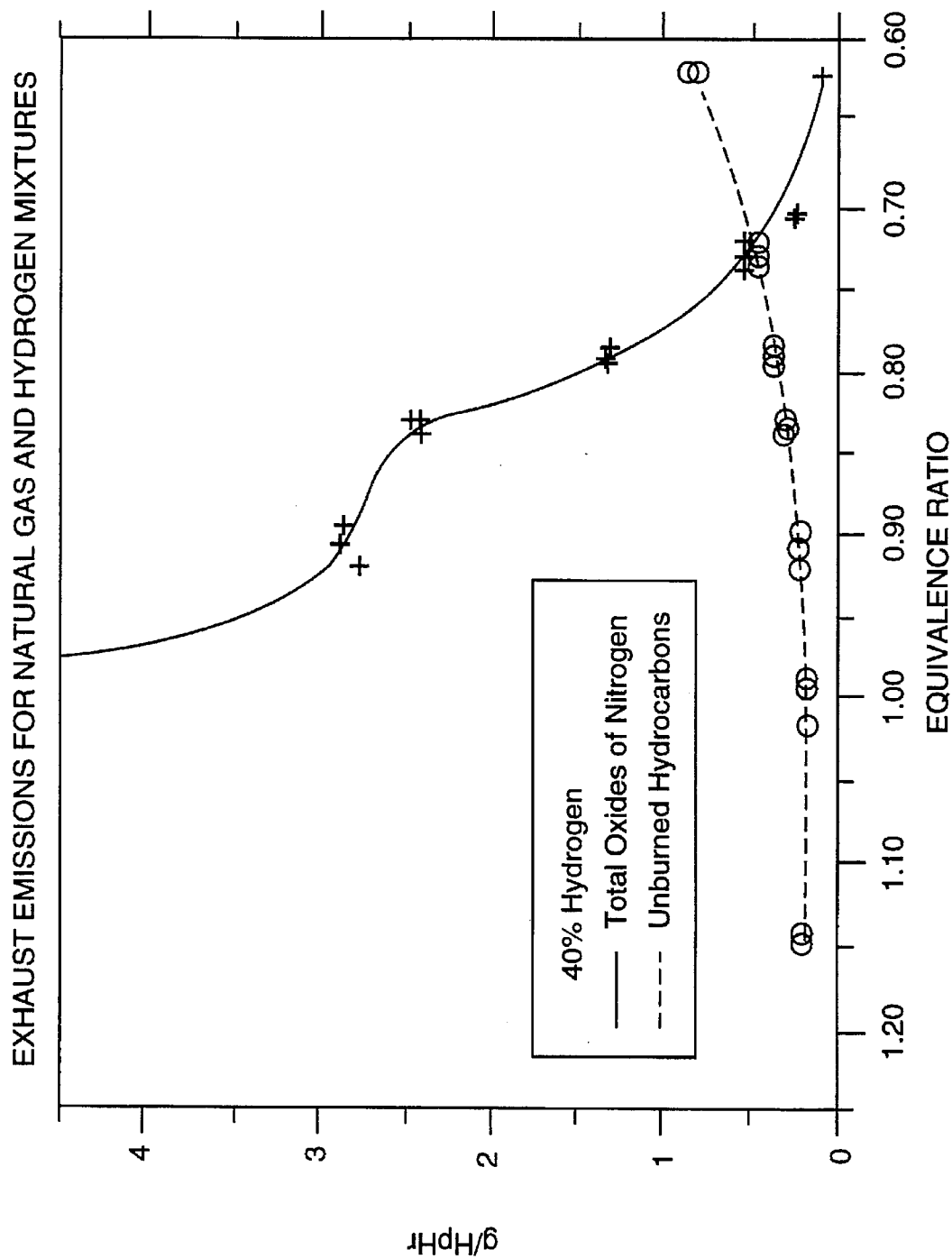
FIG. 19 shows a graph of exhaust emissions for natural gas and 40% hydrogen mixtures in grams per horse power hour(g/HpHr) vs. Equivalence ratio.
Figure 20:
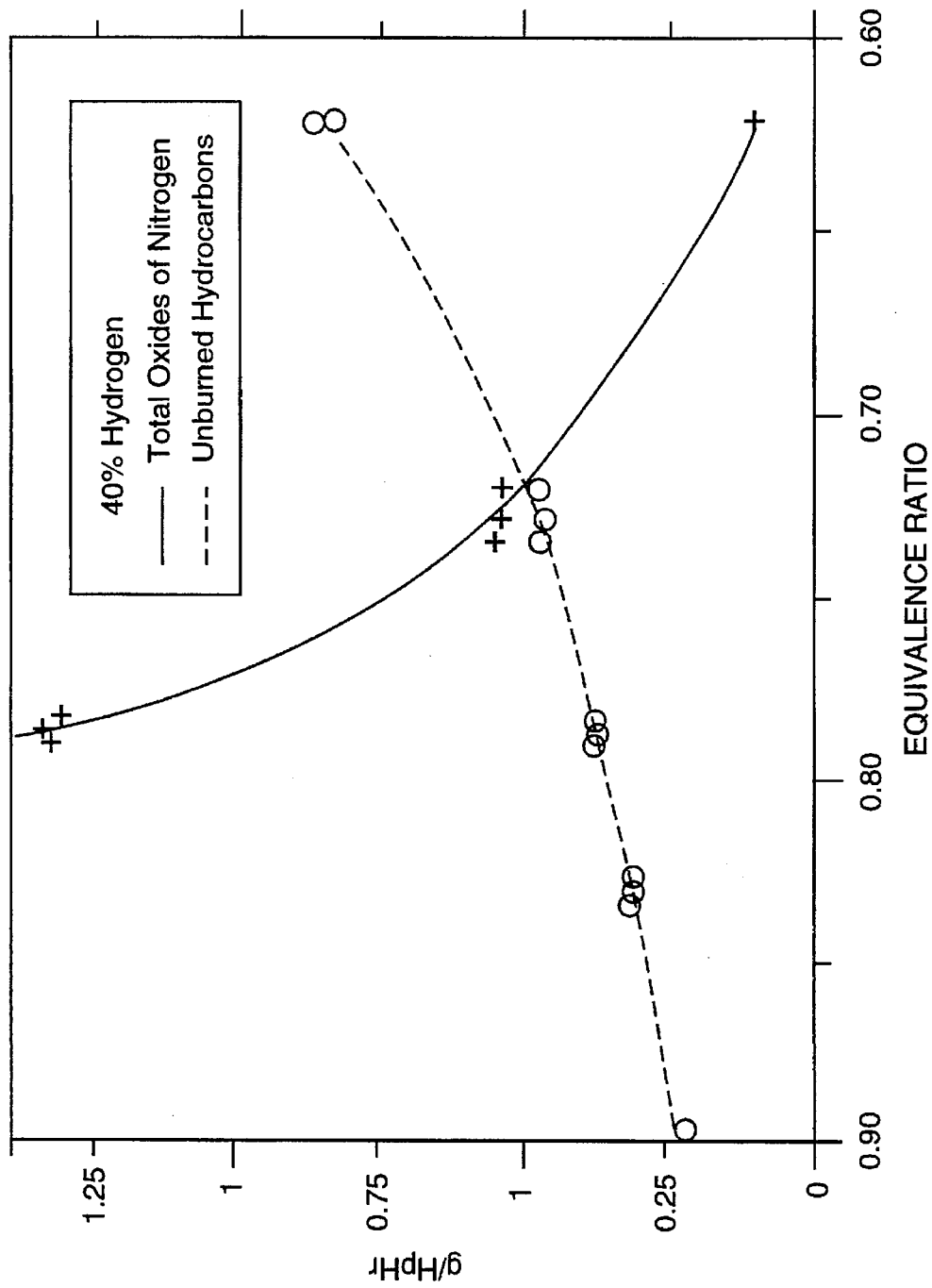
FIG. 20 shows an enlarged sectional graph of FIG. 19 of exhaust emissions for natural gas and 40% hydrogen mixtures in grams per horse power hour(g/HpHr) vs. Equivalence ratio.

Referring back to FIGS. 2 and 4 for 0% Hydrogen. Although at an equivalence ratio of 0.75 the $NO_x$ level fell significantly the hydrocarbons increased at approximately the same rate thus indicating an unstable operating condition. This same result can be noted in FIGS. 6 and 8 (11% Hydrogen) and in FIGS. 10 and 12 (20% Hydrogen). However, the lean limit extends from approximately 0.75 equivalence ratio at 0% hydrogen to 0.67 equivalence ratio at 20% hydrogen. It is not feasible to operate the engine at these lean limits since a very small change in the air fuel ratio will make a very significant increase in the $NO_x$ levels or a very significant increase in the hydrocarbon levels. When the hydrogen concentration was extended to 28% there is no longer a point where the hydrocarbons abruptly increase as was seen at all lower levels of hydrogen thus making lean burn a viable option. This same result was noted at concentrations of 36% hydrogen as seen in FIGS. 17 and 18.

The test results demonstrate that extremely low levels of $NO_x$ are possible with acceptably moderate increases in unburned hydrocarbons using 28% and 36% hydrogen supplementation. Previous research conducted at 20% hydrogen did not indicate a significant enough reduction to consider the mixture of hydrogen and natural gas as a viable solution to the problem of producing extremely low $NO_x$ levels of 20% and below. The significant reduction in $NO_x$ was realized when the hydrogen level was raised to approximately 30% and the engine was run nearer the lean limit. In addition, the lean limit of combustion was significantly extended by the increased levels of hydrogen. The $NO_x$ levels reported are an order of magnitude below the strictest current requirements. This level of $NO_x$ was achieved without a catalytic converter or other emissions reducing hardware on the engine.

The tests and related data demonstrate that levels up to approximately 50% Hydrogen can be used with combustion engines. Over 50% Hydrogen gas in the mixture could create possible problems related to storage and safety. However, the specific mixture amounts of between approximately 21 and 50% Hydrogen, can be further narrowed down by engine size(4,6,8 cylinders) and regulatory concerns.

While natural gas has been referred to as including primarily methane, natural gas can include other components in much smaller amounts. Besides primarily containing methane, natural gas can include Carbon Dioxide, Nitrogen, Ethane, Propane, Iso-Butane, N-Butane, Iso Pentane, N-Pentane, and Hexanes Plus.

While the tested engine did not use a catalytic converter, one could be added. The hydrocarbon levels at 28% and 36% hydrogen at an equivalence ratio of 0.625 were both approximately 104 ppm(0.84 gm/hp hr). Since approximately 15% of the hydrocarbons are photo reactive the total reactive hydrocarbons are approximately 16 ppm (0.13 gm/hp hr.). This level of hydrocarbon emissions is extremely low and there is the potential of reducing the total hydrocarbons to near zero through the use of a catalytic converter.

Mixtures of hydrogen and natural gas can be mixed by known methods such as but not limited to sonic mixing, or merely injecting hydrogen into natural gas, or injecting natural gas into hydrogen.

While the alternative fuel mixture in this invention has been successfully used with existing combustion engines, modifications on existing engines can be accomplished in order to enhance engine performance such as horsepower. For example, the alternative fuel disclosed herein can be used in combustion engines include but are not limited to turbocharging, engine settings(ignition, sparkplugs), camshafts, intake manifold and cylinder head modifications, compression ratios, and injection system and combinations thereof.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method for producing lean burn and near zero NOx emission rates for an internal combustion engine in an automotive vehicle using an alternative gaseous fuel, as compared to the burn and emission rates of a liquid fossil fuel comprising the steps of:

feeding an alternative gaseous fuel mixture of approximately 28% to 36% hydrogen gas with a remainder of natural gas to an internal combustion engine of an automotive vehicle; and operating the internal combustion engine of the vehicle at a lean burn air and fuel equivalence ratio, and at near zero NOx emissions below approximately 200 ppm.

2. The method of claim 1, wherein the natural gas further include constituents selected from at least one of:
Methane, Carbon Dioxide, Nitrogen, Ethane, Propane, Iso-Butane, N-Butane, Iso Pentane, N-Pentane, and Hexanes Plus.

3. The method of claim 1, wherein the operating step further includes;

a catalytic converter to further reduce hydrocarbon emissions.

4. The method of claim 1, wherein the lean burn operating step further includes:

an air and fuel equivalence ratio of approximately 0.625.

5. The method of claim 1, wherein the internal combustion engine further includes an engine size selected from one of: 4 cylinders, 6 six cylinders and 8 cylinders.

6. The method of claim 5, wherein the near zero NOx emissions includes: hydrocarbon levels of approximately 104 ppm(0.84 gm/hp hr.).

7. A method of producing lean burn and near zero NOx emission rates for an internal combustion engine used in an automotive vehicle by using an alternative gaseous fuel, as compared to the burn and emission rates of a liquid fossil fuel comprising the steps of:

feeding an alternative gaseous fuel mixture consisting of approximately 28% to 36% hydrogen gas and a remainder of natural gas to a standard internal combustion engine of an automotive vehicle, wherein the standard internal combustion engine is selected from one of 4 cylinders, 6 cylinders and 8 cylinders; and operating the internal combustion engine of the vehicle at lean burn having an air and fuel equivalence ratio of approximately 0.625, and at near zero NOx emissions below approximately 200 ppm.

8. The method of claim 7, wherein the near zero NOx emissions includes:

hydrocarbon levels of approximately 104 ppm(0.84 gm/hp hr.).

9. A method of producing lean burn and near zero NOx emission rates for an internal combustion engine used in an automotive vehicle by using an alternative gaseous fuel, as compared to the burn and emission rates of liquid fossil fuel comprising the steps of:

feeding an alternative gaseous fuel mixture consisting of approximately 30% hydrogen gas and a remainder of natural gas to a standard internal combustion engine of an automotive vehicle, wherein the standard internal combustion engine is selected from one of 4 cylinders, 6 cylinders and 8 cylinders; and operating the internal combustion engine of the vehicle at lean burn having an air and fuel equivalence ratio of approximately 0.625, and at near zero NOx emissions below approximately 200 ppm; and using a catalytic converter to further reduce NOx emissions.

10. The method of claim 9, wherein the near zero NOx emissions includes:

hydrocarbon levels of approximately 104 ppm(0.84 gm/hp hr.).

* * * * *